US011996040B2

(12) United States Patent
Pyun et al.

(10) Patent No.: US 11,996,040 B2
(45) Date of Patent: May 28, 2024

(54) DISPLAY DEVICE TO COMPENSATE IMAGE DATA BASED ON SENSING VOLTAGES

(71) Applicant: SAMSUNG DISPLAY CO., LTD., Yongin-si (KR)

(72) Inventors: Ki Hyun Pyun, Yongin-si (KR); Jang Hoon Kwak, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/313,116

(22) Filed: May 5, 2023

(65) Prior Publication Data

US 2023/0274694 A1 Aug. 31, 2023

Related U.S. Application Data

(63) Continuation of application No. 17/544,057, filed on Dec. 7, 2021, now Pat. No. 11,645,972.

(30) Foreign Application Priority Data

Apr. 5, 2021 (KR) ........................ 10-2021-0043932

(51) Int. Cl.
*G09G 3/32* (2016.01)

(52) U.S. Cl.
CPC ......... *G09G 3/32* (2013.01); *G09G 2310/027* (2013.01); *G09G 2320/0242* (2013.01);
(Continued)

(58) Field of Classification Search
CPC .... G09G 3/006; G09G 3/32; G09G 2310/027; G09G 2320/0242; G09G 2320/041;
(Continued)

(56) References Cited

U.S. PATENT DOCUMENTS

| | | | |
|---|---|---|---|
| 7,773,059 | B2 | 8/2010 | Jeon et al. |
| 7,986,317 | B2 | 7/2011 | Kim |

(Continued)

FOREIGN PATENT DOCUMENTS

| | | |
|---|---|---|
| KR | 10-1058111 | 8/2011 |
| KR | 10-1142281 | 5/2012 |

(Continued)

OTHER PUBLICATIONS

Notice of Allowance dated Jan. 3, 2023 in corresponding U.S. Appl. No. 17/544,057.

(Continued)

*Primary Examiner* — Gene W Lee
(74) *Attorney, Agent, or Firm* — F. Chau & Associates, LLC

(57) ABSTRACT

A display device may include first pixels configured to emit light in a first color, second pixels configured to emit light in a second color different from the first color, a data driver configured to supply first reference voltages to data lines coupled to the first pixels, and a sensing circuit configured to receive first sensing voltages from sensing lines coupled to the first pixels, wherein the data driver supplies second reference voltages different from the first reference voltages to data lines coupled to the second pixels, and the sensing circuit receives second sensing voltages from sensing lines coupled to the second pixels.

20 Claims, 16 Drawing Sheets

(52) U.S. Cl.
CPC . *G09G 2320/041* (2013.01); *G09G 2320/043* (2013.01); *G09G 2320/045* (2013.01); *G09G 2320/048* (2013.01); *G09G 2330/12* (2013.01)

(58) Field of Classification Search
CPC ....... G09G 2320/043; G09G 2320/045; G09G 2320/048; G09G 2330/12
See application file for complete search history.

(56) References Cited

U.S. PATENT DOCUMENTS

| | | | | |
|---|---|---|---|---|
| 8,711,084 | B2 | 4/2014 | Lee et al. | |
| 8,860,767 | B2 | 10/2014 | Yu et al. | |
| 9,123,289 | B2 | 9/2015 | Kim et al. | |
| 9,373,280 | B2 | 6/2016 | Yoon et al. | |
| 10,559,254 | B2 | 2/2020 | Park | |
| 11,017,714 | B2 | 5/2021 | Park | |
| 11,087,681 | B2 | 8/2021 | Park | |
| 11,244,632 | B2 | 2/2022 | Eom et al. | |
| 11,282,463 | B2 | 3/2022 | Kim et al. | |
| 11,355,066 | B2 | 6/2022 | Lee et al. | |
| 2008/0158218 | A1 | 7/2008 | Kim | |
| 2011/0069058 | A1 | 3/2011 | Chung et al. | |
| 2015/0001504 | A1 | 1/2015 | Kim et al. | |
| 2015/0062192 | A1 | 3/2015 | Kim et al. | |
| 2016/0155380 | A1 | 6/2016 | Kwon et al. | |
| 2016/0351096 | A1 | 12/2016 | Tani et al. | |
| 2017/0069273 | A1* | 3/2017 | Park | G09G 3/3233 |
| 2020/0160785 | A1* | 5/2020 | Park | G09G 3/3233 |
| 2020/0243018 | A1 | 7/2020 | Kim et al. | |
| 2020/0380919 | A1 | 12/2020 | Hwang et al. | |
| 2021/0090491 | A1* | 3/2021 | Park | G09G 3/3233 |
| 2021/0264860 | A1* | 8/2021 | Eom | G09G 3/3258 |
| 2022/0319368 | A1 | 10/2022 | Pyun et al. | |

FOREIGN PATENT DOCUMENTS

| | | |
|---|---|---|
| KR | 10-1329966 | 11/2013 |
| KR | 10-2018-0036298 | 4/2018 |
| KR | 10-1992904 | 6/2019 |

OTHER PUBLICATIONS

Office Action dated Aug. 18, 2022 in corresponding U.S. Appl. No. 17/544,057.

* cited by examiner

<THRESHOLD VOLTAGE SENSING PERIOD>

DISPLAY DEVICE TO COMPENSATE IMAGE DATA BASED ON SENSING VOLTAGES

CROSS-REFERENCE TO RELATED APPLICATION

This non-provisional U.S. patent application is a continuation application of U.S. patent application Ser. No. 17/544,057 filed Dec. 7, 2021, which claims priority under 35 U.S.C. § 119 to Korean patent application number 10-2021-0043932 filed on Apr. 5, 2021, the entire disclosures of which are incorporated by reference herein in their entirety.

BACKGROUND

1. Technical Field

Various embodiments of the present disclosure relate to a display device.

2. Discussion of Related Art

With the development of information technology, a display device is a useful connection medium between a user and information. Examples of display devices include a liquid crystal display (LCD) device and an organic light-emitting display device.

A display device may include a plurality of pixels, and the pixels may emit light in various colors and with various luminance levels, thus displaying various images.

The pixels may include light-emitting diodes and pixel circuits having one or more transistors. However, as the area of the display device increases, process variations may occur depending on the locations of the pixels. The transistors which perform the same function in respective pixels may have differences in characteristics, such as mobility or threshold voltages. Similarly, threshold voltages of the light-emitting diodes in respective pixels may be different from each other.

Degradation of the pixels may occur while a user utilizes products including the pixels. Further, the degree of degradation of respective pixels may differ from each other depending on usage frequency and temperature.

SUMMARY

At least one embodiment of the present disclosure is directed to a display device that is capable of sensing pixels in consideration of process variation and degree of degradation.

An embodiment of the present disclosure includes a display device. The display device may include first pixels configured to emit light in a first color; second pixels configured to emit light in a second color different from the first color; a data driver configured to supply first reference voltages to data lines coupled to the first pixels; and a sensing circuit configured to receive first sensing voltages from sensing lines coupled to the first pixels, wherein the data driver supplies second reference voltages different from the first reference voltages to data lines coupled to the second pixels, and wherein the sensing circuit receives second sensing voltages from sensing lines coupled to the second pixels.

The first reference voltages may have an identical magnitude, and the second reference voltages may have an identical magnitude.

The display device may further include a sensing controller configured to determine the first reference voltages and the second reference voltages, wherein the sensing controller may include a maximum value extractor configured to extract a first maximum value from past compensation values for the first pixels and extract a second maximum value from past compensation values for the second pixels.

The sensing controller may further include a degradation information provider configured to provide degradation information for the first pixels and the second pixels.

The degradation information may be determined based on at least one of temperature, grayscale, and usage time of the first pixels and the second pixels.

The sensing controller may further include a lookup table configured to provide a first base voltage value for the first pixels corresponding to the degradation information and a second base voltage value for the second pixels corresponding to the degradation information.

The sensing controller may further include a reference voltage calculator configured to calculate a first reference voltage by adding the first base voltage value to the first maximum value and calculate a second reference voltage by adding the second base voltage value to the second maximum value.

The display device may further include a high voltage generator configured to generate a high voltage; and a grayscale voltage generator configured to generate grayscale voltages based on the high voltage, wherein the reference voltage calculator generates the first reference voltage and the second reference voltage based on the high voltage and the grayscale voltages.

The display device may further include a high voltage generator configured to generate a high voltage; a first grayscale voltage generator configured to generate first grayscale voltages for the first pixels based on the high voltage; and a second grayscale voltage generator configured to generate second grayscale voltages for the second pixels based on the high voltage, wherein the reference voltage calculator generates the first reference voltage based on the high voltage and the first grayscale voltages, and generates the second reference voltage based on the high voltage and the second grayscale voltages.

One of the first pixels and one of the second pixels may be coupled to an identical sensing line.

The display device may further include third pixels configured to emit light in a third color different from the first color and the second color, wherein the data driver supplies third reference voltages, different from the first reference voltages and the second reference voltages, to data lines coupled to the third pixels, and wherein the sensing circuit receives third sensing voltages from sensing lines coupled to the third pixels.

The first reference voltages may have an identical magnitude, the second reference voltages may have an identical magnitude, and the third reference voltages may have an identical magnitude.

The display device may further include a sensing controller configured to determine the first reference voltages, the second reference voltages, and the third reference voltages, wherein the sensing controller may include a maximum value extractor configured to extract a first maximum value from past compensation values for the first pixels, extract a second maximum value from past compensation values for the second pixels, and extract a third maximum value from past compensation values for the third pixels.

The sensing controller may further include a degradation information provider configured to provide degradation information for the first pixels, the second pixels, and the third pixels.

The degradation information may be determined based on at least one of temperature, grayscale, and usage time of the first pixels, the second pixels, and the third pixels.

The sensing controller may further include a lookup table configured to provide a first base voltage value for the first pixels corresponding to the degradation information, a second base voltage value for the second pixels corresponding to the degradation information, and a third base voltage value for the third pixels corresponding to the degradation information.

The sensing controller may further include a reference voltage calculator configured to calculate a first reference voltage by adding the first base voltage values to the first maximum value, calculate a second reference voltage by adding the second base voltage value to the second maximum value, and calculate a third reference voltage by adding the third base voltage value to the third maximum value.

The display device may further include a high voltage generator configured to generate a high voltage; and a grayscale voltage generator configured to generate grayscale voltages based on the high voltage, wherein the reference voltage calculator generates the first reference voltage, the second reference voltage, and the third reference voltage based on the high voltage and the grayscale voltages.

The display device may further include a high voltage generator configured to generate a high voltage; a first grayscale voltage generator configured to generate first grayscale voltages for the first pixels based on the high voltage; a second grayscale voltage generator configured to generate second grayscale voltages for the second pixels based on the high voltage; and a third grayscale voltage generator configured to generate third grayscale voltages for the third pixels based on the high voltage, wherein the reference voltage calculator generates the first reference voltage based on the high voltage and the first grayscale voltages, generates the second reference voltage based on the high voltage and the second grayscale voltages, and generates the third reference voltage based on the high voltage and the third grayscale voltages.

One of the first pixels, one of the second pixels, and one of the third pixels may be coupled to an identical sensing line.

DETAILED DESCRIPTION

Figure 1:
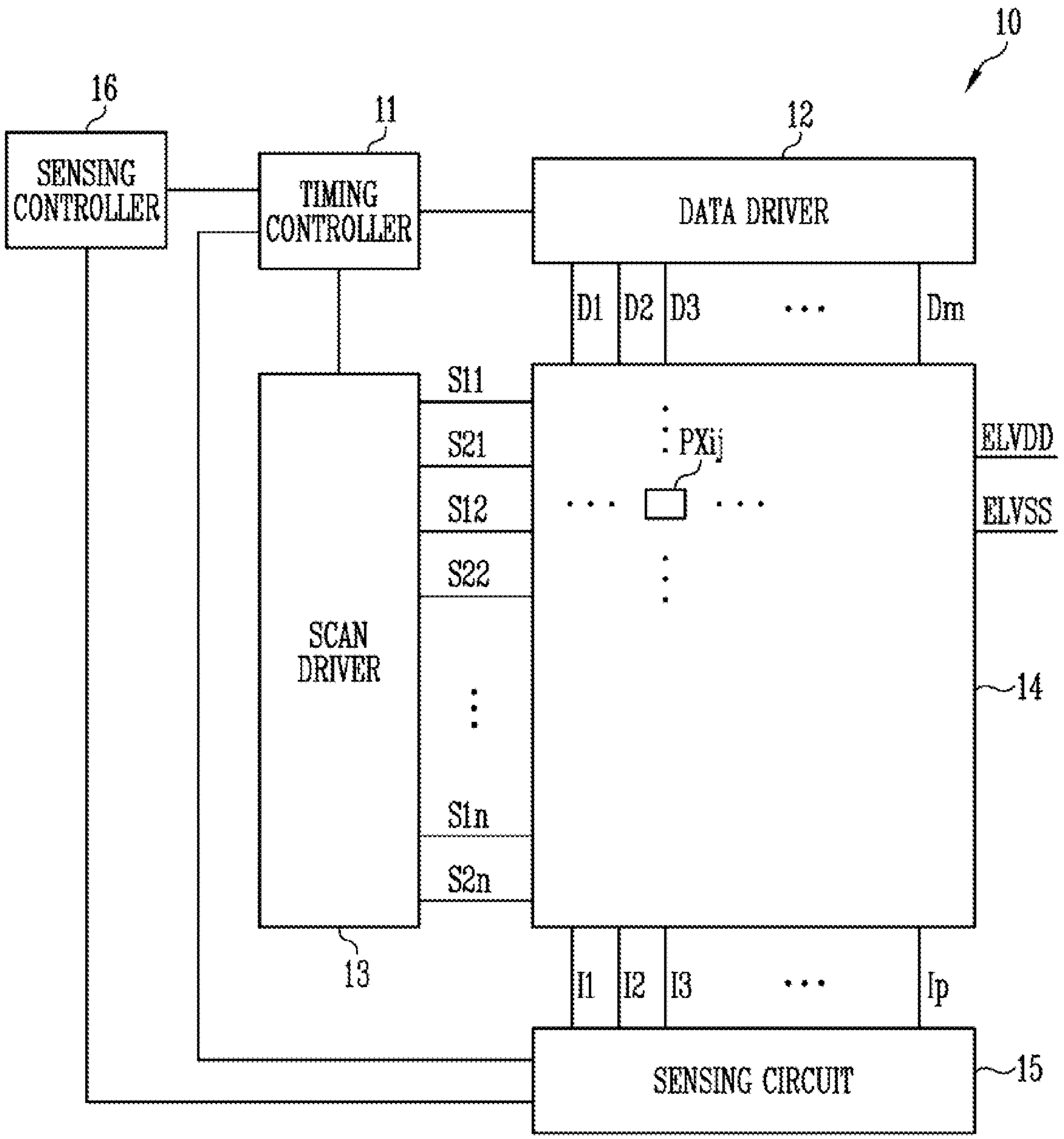
FIG. 1 is a diagram illustrating a display device according to an embodiment of the present disclosure.

Hereinafter, embodiments of the present disclosure will be described in detail with reference to the attached drawings so that those of ordinary skill in the art can practice the present disclosure. The present disclosure may be embodied in various different forms without being limited to the following embodiments.

Similar reference numerals may be used throughout the different drawings to designate similar components. Therefore, reference numerals described in a previous drawing may be used in other drawings.

Although certain sizes and thicknesses of respective components are indicated in drawings, the present disclosure is not necessarily limited thereto. The sizes and thicknesses of components in the drawings may be exaggerated to make the description of a plurality of various layers and areas clear.

Furthermore, in the following description, "the same or identical" may mean "substantially the same or substantially identical". That is, "the same or identical" may mean that a certain element is identical enough for those skilled in the art to understand that the certain element is the same as or identical to an additional element. Other expressions may be expressions from which "substantially" is omitted.

FIG. 1 is a diagram illustrating a display device according to an embodiment of the present disclosure.

Referring to FIG. 1, a display device 10 according to an embodiment of the present disclosure includes a timing controller 11 (e.g., a control circuit), a data driver 12 (e.g., a driver circuit), a scan driver 13 (e.g., driver circuit), a pixel component 14 (e.g., a display panel), a sensing circuit 15, and a sensing controller 16 (e.g., a control circuit).

The timing controller 11 may receive input grayscale values and control signals for respective image frames from a processor. For example, the processor may provide a first input grayscale value (e.g., a red input grayscale value), a second input grayscale value (e.g., a green input grayscale value), and a third input grayscale value (e.g., a blue input grayscale value) for each dot or pixel. The timing controller 11 may provide compensation grayscale values, obtained by compensating for the received input grayscale values, to the data driver 12. Further, the timing controller 11 may provide control signals suitable for respective specifications of the data driver 12, the scan driver 13, the sensing circuit 15, and the sensing controller 16 to the data driver 12, the scan driver 13, the sensing circuit 15, and the sensing controller 16.

During a display period, the data driver 12 may generate data voltages to be provided to data lines D1, D2, D3, . . . , Dm using the compensation grayscale values and the control signals received from the timing controller 11. For example, the data driver 12 may sample the compensation grayscale values using a clock signal, and may apply data voltages corresponding to the compensation grayscale values to the data lines D1 to Dm in units of pixel rows. Here, m may be an integer greater than 0. Here, a pixel row may indicate pixels coupled to the same scan line (or gate line) and the same sensing line.

During a sensing period, the data driver 12 may receive information about first reference voltages, second reference voltages, and third reference voltages from the timing controller 11. The data driver 12 may supply first reference voltages to data lines coupled to first pixels. The first reference voltages may have the same magnitude. Further, the data driver 12 may supply second reference voltages different from the first reference voltages to data lines coupled to second pixels. The second reference voltages may have the same magnitude. Furthermore, the data driver 12 may supply third reference voltages different from the first reference voltages and the second reference voltages to data lines coupled to third pixels. The third reference voltages may have the same magnitude.

Here, the first pixels are pixels configured to emit light in a first color. Further, the second pixels are pixels configured to emit light in a second color different from the first color. Furthermore, the third pixels are pixels configured to emit light in a third color different from the first color and the second color.

The scan driver 13 may receive at least one of a clock signal and a scan start signal from the timing controller 11, and may then generate first scan signals to be provided to first scan lines S11, S12, . . . , S1*n* and second scan signals to be provided to second scan lines S21, S22, S2*n*. Here, n may be an integer greater than 0.

For example, the scan driver 13 may sequentially provide first scan signals, each having a turn-on level pulse, to the first scan lines S11, S12, . . . , S1*n*. Also, the scan driver 13 may sequentially provide second scan signals, each having a turn-on level pulse, to the second scan lines S21, S22, S2*n*.

For example, the scan driver 13 may include a first scan driver coupled to the first scan lines S11, S12, . . . , S1*n* and a second scan driver coupled to the second scan lines S21, S22, . . . , S2*n*. Each of the first scan driver and the second scan driver may include scan stages configured in the form of shift registers. Each of the first scan driver and the second scan driver may generate scan signals in a manner in which a scan start signal having the form of a turn-on level pulse is sequentially transferred to a next scan stage, under the control of the clock signal.

During a display period, the sensing circuit 15 may receive the control signals from the timing controller 11, and may then supply initialization voltages to sensing lines I1, I2, I3, . . . , Ip. Here, p may be an integer greater than 0.

During a sensing period, the sensing circuit 15 may receive first sensing voltages from the sensing lines coupled to the first pixels. During a sensing period, the sensing circuit 15 may receive second sensing voltages from the sensing lines coupled to the second pixels. Further, the sensing circuit 15 may receive third sensing voltages from the sensing lines coupled to the third pixels.

The sensing circuit 15 may include sensing channels coupled to the sensing lines I1, I2, I3, . . . , Ip. For example, the sensing lines I1, I2, I3, . . . , Ip may correspond to the sensing channels in one-to-one correspondence. For example, the number of sensing lines I1, I2, I3, . . . , Ip may be identical to the number of sensing channels.

The pixel component 14 may include a plurality of pixels. Each pixel PXij may be coupled to a data line, a scan line, and a sensing line that correspond to the pixel Pxij. The pixels may be coupled to common power lines, that is, a first power line ELVDD and a second power line ELVSS. For example, during a display period, the voltage of the first power line ELVDD may be higher than that of the second power line ELVSS.

The sensing controller 16 may determine the first reference voltages, the second reference voltages, and the third reference voltages. The sensing controller 16 may provide the determined first reference voltages, second reference voltages, and third reference voltages to the timing controller 11. Here, the first to third reference voltages may have the form of analog voltages or digital data.

During a sensing period, the timing controller 11 may provide information about the received first to third reference voltages to the data driver 12. The information about the first to third reference voltages may have the form of digital data or analog voltages.

During a display period, the timing controller 11 generates the first compensation grayscale values by compensating for the first input grayscale values for the first pixels based on the first sensing voltages. Further, the timing controller 11 generates the second compensation grayscale values by compensating for the second input grayscale values for the second pixels based on the second sensing voltages. Furthermore, the timing controller 11 generates the third compensation grayscale values by compensating for the third input grayscale values for the third pixels based on the third sensing voltages. The timing controller 11 may provide the first to third compensation grayscale values to the data driver 12.

Figure 2:
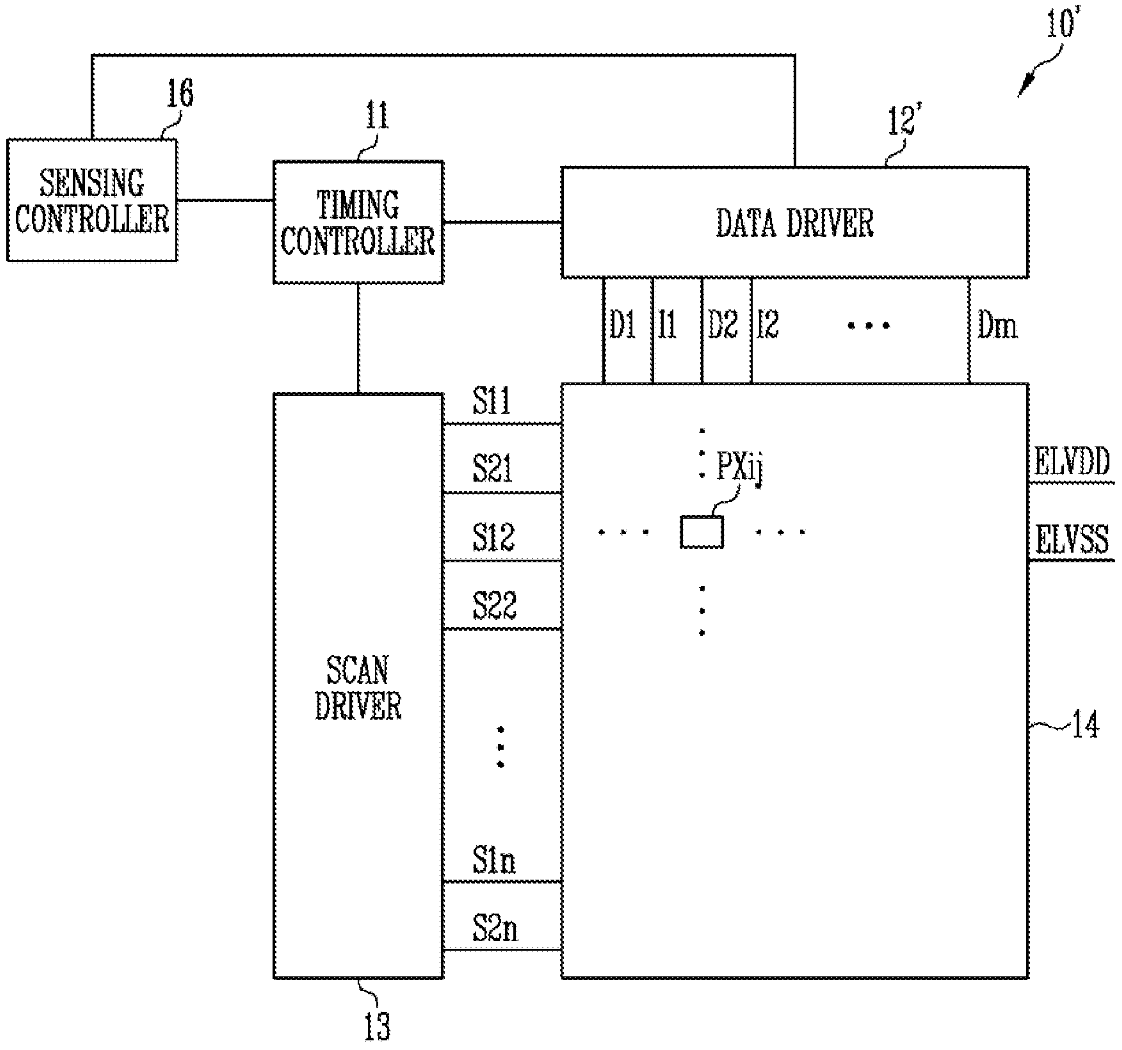
FIG. 2 is a diagram illustrating a display device according to an embodiment of the present disclosure.

FIG. 2 is a diagram illustrating a display device according to an embodiment of the present disclosure.

A display device 10' of FIG. 2 includes a timing controller 11, a data driver 12', a scan driver 13, a pixel component 14, and a sensing controller 16.

The data driver 12' of the display device 10' of FIG. 2 may be a configuration into which the data driver 12 and the sensing circuit 15 of the display device 10 of FIG. 1 are integrated with each other. That is, in the display device 10 of FIG. 1, the data driver 12 and the sensing circuit 15 may be implemented as separate integrated circuit (IC) chips, but the data driver 12' of the display device 10' of FIG. 2 may be implemented as a single IC chip.

Therefore, the data driver 12' may be coupled to data lines D1, D2, . . . , Dm and sensing lines I1 and I2. The display device 10' does not include the sensing circuit 15 of FIG. 1.

Figure 3:
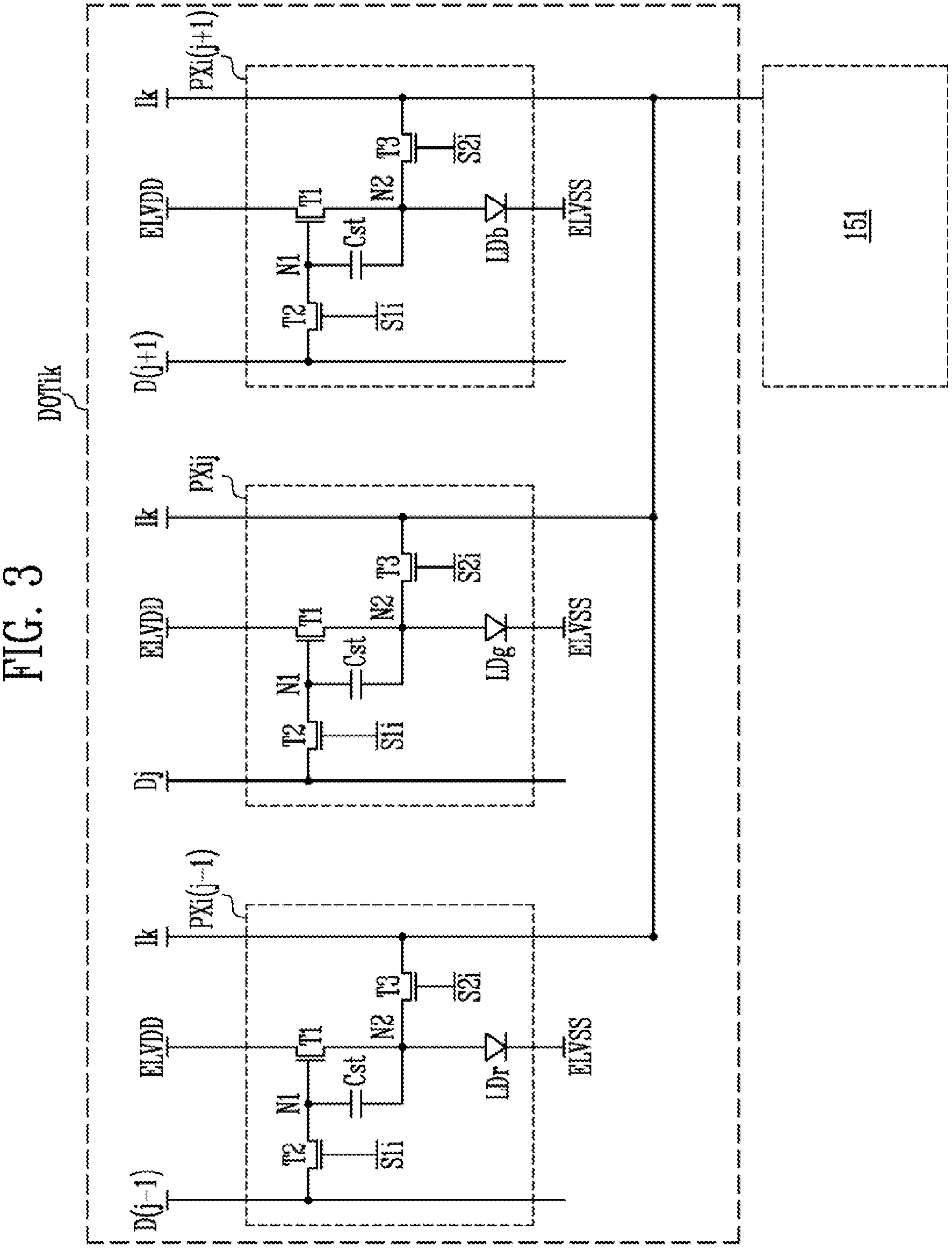
FIGS. 3 and 4 are diagrams illustrating pixels and sensing channels according to an embodiment of the present disclosure.
Figure 4:
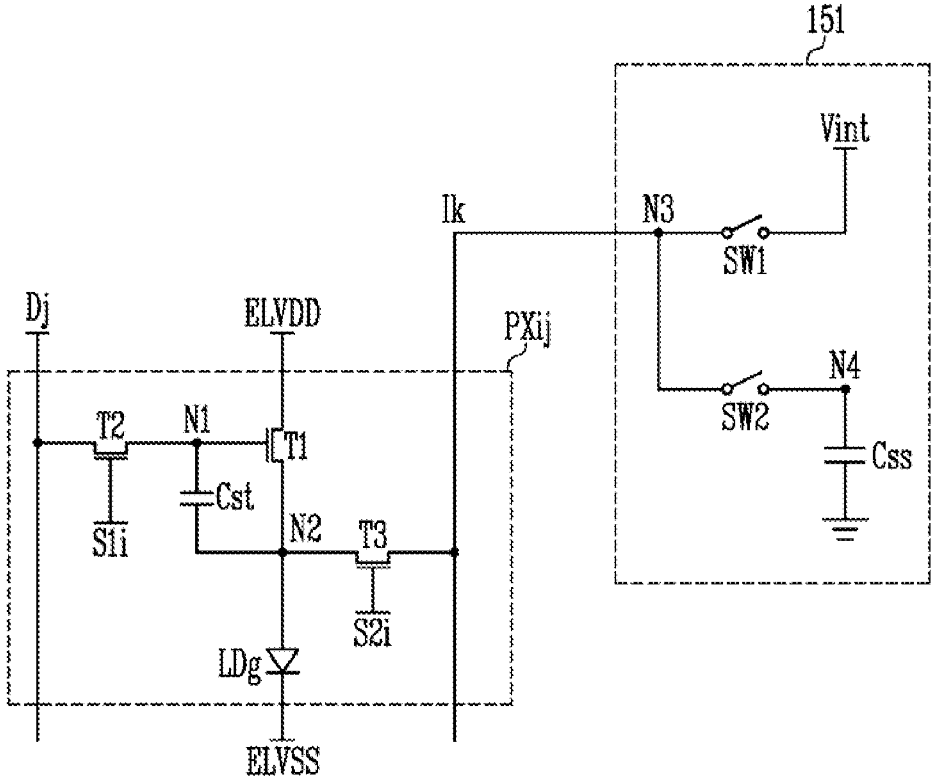

FIGS. 3 and 4 are diagrams illustrating pixels and sensing channels according to an embodiment of the present disclosure.

Referring to FIG. 3, a dot DOTik according to an embodiment of the present disclosure includes a plurality of pixels Pxi(j−1), Pxij, and Pxi(j+1). For example, the plurality of pixels Pxi(j−1), Pxij, and Pxi(j+1) included in the same dot DOTik may be coupled in common to one sensing channel 151 through the same sensing line Ik. For example, one Pxi(j−1) of the first pixels, one Pxij of the second pixels, and one Pxi(j+1)) of the third pixels may be coupled to the same sensing line Ik.

For example, the plurality of pixels Pxi(j−1), Pxij, and Pxi(j+1) may be pixels of different colors. For example, the pixel Pxi(j−1) may be a pixel of a first color, the pixel Pxij may be a pixel of a second color, and the pixel Pxi(j+1) may be a pixel of a third color. That is, the pixel Pxi(j−1) may include a light-emitting diode LDr that is capable of emitting light in a first color, the pixel Pxij may include a light-emitting diode LDg that is capable of emitting light in a second color, and the pixel Pxi(j+1) may include a light-emitting diode LDb that is capable of emitting light in a third color.

The first color, the second color, and the third color may be different colors. For example, the first color may be one of red, green, and blue, the second color may be one of red, green, and blue, other than the first color, and the third color may be one of red, green, and blue other than the first color and the second color. Also, magenta, cyan, and yellow may be used instead of red, green, and blue as the first to third colors.

In accordance with an embodiment, the sensing circuit 15 senses pixels of the same color when sensing feature information of the pixels in the pixel component 14. For example, the sensing circuit 15 may sense the feature information of the pixels of the first color in the pixel component 14 during a first color sensing period. Similarly, the sensing circuit 15 may sense the feature information of the pixels of the second color during a second color sensing period different from the first color sensing period. Furthermore, the sensing circuit 15 may sense the feature information of the pixels of the third color during a third color sensing period different from the first color sensing period and the second color sensing period.

For example, while the pixel Pxi(j−1) of the first color is sensed, data voltages having a turn-off level may be applied to data lines Dj and D(j+1) of the pixels Pxij and Pxi(j+1) of other colors. Therefore, while the pixel Pxi(j−1) of the first color is sensed, the first transistors T1 of the pixels Pxij and Pxi(j+1) are turned off, thus preventing the pixels Pxij and Pxi(j+1) from influencing the feature information of the pixel Pxi(j−1).

In FIG. 3, on the assumption that each dot has an RGB stripe structure, three pixels are illustrated as being equally coupled to the scan lines S1*i* and S2*i*. In an embodiment, when each dot is configured in a pentile structure, the dot may include only two pixels. In an embodiment, each dot may include pixels of different colors, which are coupled to different scan lines and which share the same sensing line with each other.

First, embodiments of configurations of the pixel Pxij and the sensing channel 151 will be described below with reference to FIG. 4.

In an embodiment, the pixel Pxij includes transistors T1, T2, and T3, a storage capacitor Cst, and a light-emitting diode LDg.

The transistors T1, T2, and T3 may be implemented as N-type transistors. In an embodiment, the transistors T1, T2, and T3 may be implemented as P-type transistors. In an embodiment, the transistors T1, T2, and T3 may be implemented as a combination of an N-type transistor and a P-type transistor. The term "P-type transistor" is commonly designated as a transistor through which an increased amount of current flows as a voltage difference between a gate electrode and a source electrode increases in a negative direction. The term "N-type transistor" is commonly designated as a transistor through which an increased amount of current flows as a voltage difference between a gate electrode and a source electrode increases in a positive direction. Each transistor may be implemented as any of various types of transistors, such as a thin film transistor (TFT), a field effect transistor (FET), and a bipolar junction transistor (BJT).

The first transistor T1 may have a gate electrode coupled to a first node N1, a first electrode coupled to a first power line ELVDD, and a second electrode coupled to a second node N2. The first transistor T1 may be referred to as a driving transistor.

The second transistor T2 may have a gate electrode coupled to a first scan line S1*i*, a first electrode coupled to a data line Dj, and a second electrode coupled to the first node N1. The second transistor T2 may be referred to as a scan transistor.

The third transistor T3 may have a gate electrode coupled to a second scan line S2*i*, a first electrode coupled to the second node N2, and a second electrode coupled to a sensing line Ik. The third transistor T3 may be referred to as a sensing transistor.

The storage capacitor Cst may have a first electrode coupled to the first node N1 and a second electrode coupled to the second node N2.

The light-emitting diode LDg may have an anode coupled to the second node N2 and a cathode coupled to a second power line ELVSS.

Generally, the voltage of the first power line ELVDD may be higher than that of the second power line ELVSS. However, in a special situation such as for prevention of light emission by the light-emitting diode LDg, the voltage of the second power line ELVSS may be set to a voltage higher than that of the first power line ELVDD.

The sensing channel 151 includes a first switch SW1, a second switch SW2, and a sensing capacitor Css.

A first electrode of the first switch SW1 is coupled to a third node N3. For example, the third node N3 may correspond to the sensing line Ik. A second electrode of the first switch SW1 receives an initialization voltage Vint. The second electrode of the first switch SW1 may be coupled to an initialization power source which supplies the initialization voltage Vint.

A first electrode of the second switch SW2 is coupled to the third node N3 and a second electrode thereof is coupled to a fourth node N4.

The sensing capacitor Css has a first electrode coupled to the fourth node N4 and a second electrode coupled to a reference power source (e.g., ground).

Although not illustrated in the drawing, the sensing circuit 15 may include an analog-to-digital converter (ADC). For example, the sensing circuit 15 may include a number of analog-to-digital converters (ADCs) corresponding to the number of sensing channels. Each analog-to-digital converter may convert a sensing voltage stored in the sensing capacitor Css into a digital value. The converted digital value may be provided to the timing controller 11 or the sensing controller 16. In other embodiments, the sensing circuit 15 may include a number of ADCs less than the number of sensing channels, and may convert sensing signals, stored in the sensing channels, by time-dividing the sensing signals.

Figure 5:
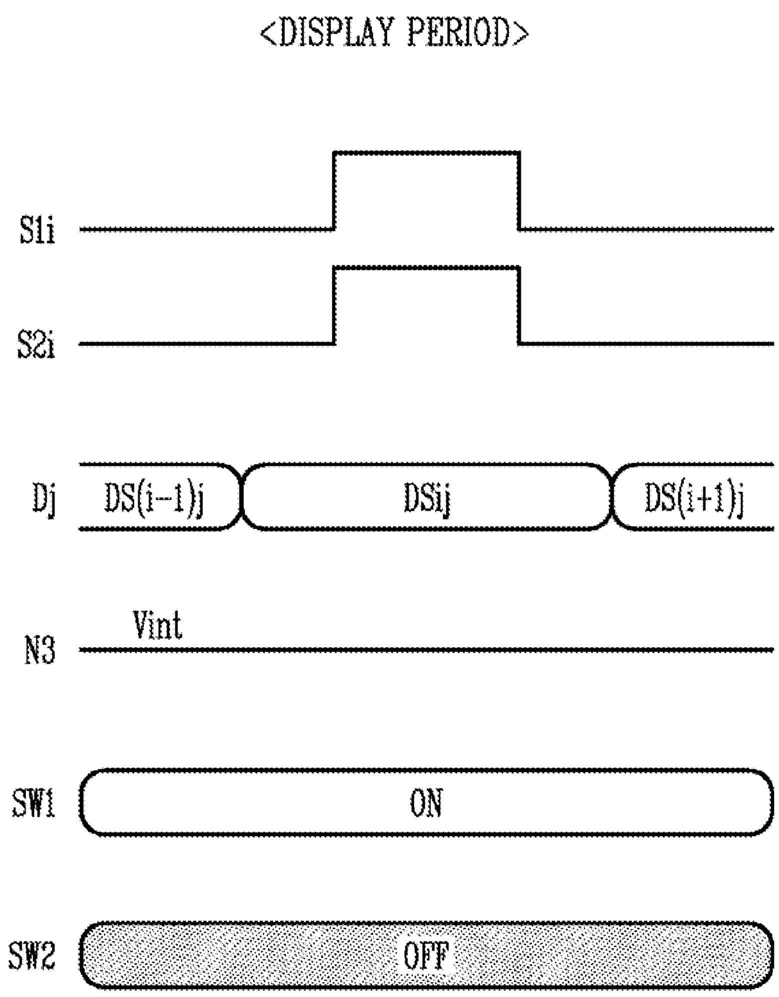
FIG. 5 is a diagram illustrating a display period according to an embodiment of the present disclosure.

FIG. 5 is a diagram illustrating a display period according to an embodiment of the present disclosure.

Referring to FIG. 5, during a display period, the sensing line Ik, that is, the third node N3, receives the initialization voltage Vint. During the display period, the first switch SW1 is in a turn-on state, and the second switch SW2 is in a turn-off state. For example, when the first switch SW1 is implemented by a first transistor and the second switch SW2 is implemented by a second transistor, a first signal may be provided to a gate of the first transistor to turn on the first transistor and a second signal may be provided to a gate of the second transistor to turn off the second transistor.

During the display period, data voltages DS(i−1)j, Dsij, and DS(i+1)j may be sequentially applied to the data line Dj on a horizontal period basis. A first scan signal having a turn-on level (i.e., a logic high level) may be applied to the first scan line S1*i* during a corresponding horizontal period.

Also, a second scan signal having a turn-on level may also be applied to the second scan line S2*i* in synchronization with the first scan line S1*i*. In an embodiment, during the display period, the second scan signal having a turn-on level may always be applied to the second scan line S2*i*.

For example, when scan signals having a turn-on level are applied to the first scan line S1*i* and the second scan line S2*i*, the second transistor T2 and the third transistor T3 may be turned on. Therefore, a voltage corresponding to the difference between the data voltage Dsij and the initialization voltage Vint is written to the storage capacitor Cst of the pixel Pxij.

In the pixel Pxij, the amount of driving current that flows through a driving path for coupling the first power line ELVDD, the first transistor T1, the light-emitting diode LDg, and the second power line ELVSS is determined depending on the voltage difference between the gate electrode and the source electrode of the first transistor T1. The luminance of light emitted from the light-emitting diode LDg may be determined depending on the amount of driving current.

Thereafter, when a scan signal having a turn-off level (i.e., a logic low level) is applied to the first scan line S1*i* and the second scan line S2*i*, the second transistor T2 and the third transistor T3 may be turned off. Therefore, regardless of a change in the voltage of the data line Dj, by means of the storage capacitor Cst, the voltage difference between the gate electrode and the source electrode of the first transistor T1 may be maintained, and the luminance of light emitted from the light-emitting diode LDg may be maintained.

Figure 6:
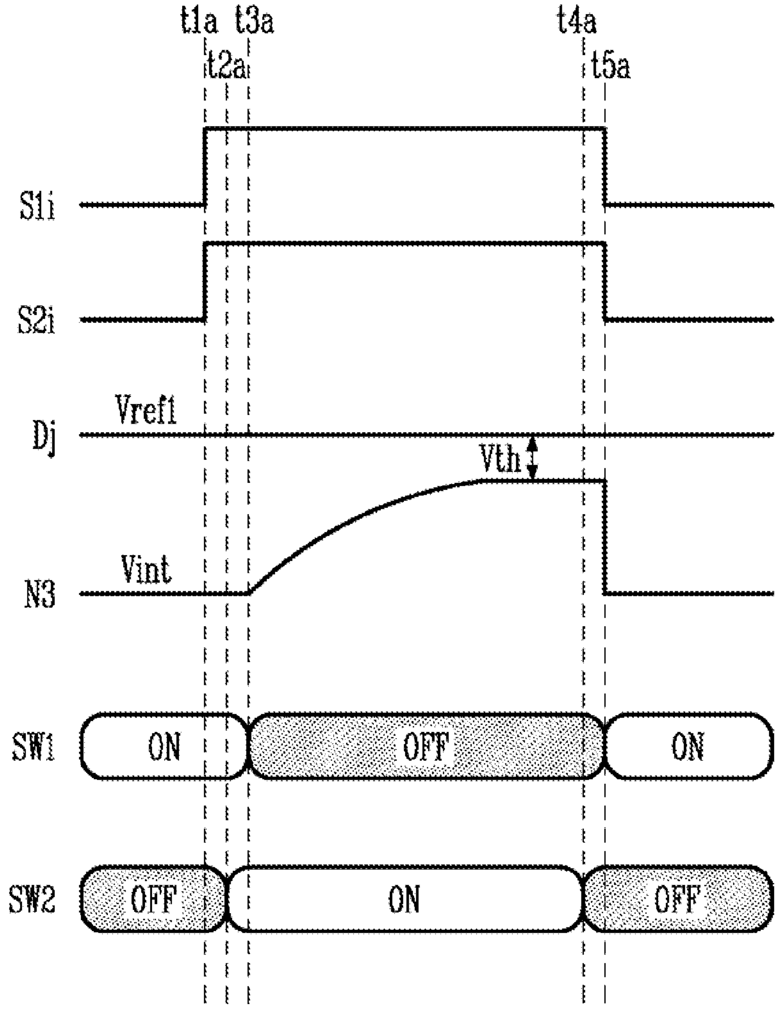
FIG. 6 is a diagram illustrating a threshold voltage sensing period of a transistor according to an embodiment of the present disclosure.

FIG. 6 is a diagram illustrating a threshold voltage sensing period of a transistor according to an embodiment of the present disclosure.

Before a time point t1*a*, the first switch SW1 is in a turn-on state, and the second switch SW2 is in a turn-off state. Therefore, the initialization voltage Vint is applied to the third node N3. Further, the data driver 12 supplies a reference voltage Vref1 to the data line Dj. In an embodiment, the reference voltage Vref1 is a constant voltage that may differ from the data voltage that is supplied to the data line Dj during the display period whose voltage level may vary.

At the time point t1*a*, the first scan signal having a turn-on level is supplied to the first scan line S1*i*, and a second scan signal having a turn-on level is supplied to the second scan line S2*i*. Accordingly, the reference voltage Vref1 is applied to the first node N1, and the initialization voltage Vint is applied to the second node N2. Therefore, the first transistor T1 may be turned on depending on the difference between the gate voltage and the source voltage of the first transistor T1.

At a time point t2*a*, the second switch SW2 is turned on. Accordingly, the first electrode of the sensing capacitor Css is initialized to the initialization voltage Vint.

At a time point t3*a*, the first switch SW1 is turned off. Accordingly, current is supplied from the first power line ELVDD, and thus the voltages of the second node N2 and the third node N3 may increase. When the voltages of the second node N2 and the third node N3 increase up to a voltage of (Vref1−Vth), the first transistor T1 is turned off, and thus the voltages of the second node N2 and the third node N3 do not increase any more. Since the fourth node N4 is coupled to the third node N3 through the second switch SW2 being in a turn-on state, the sensing voltage (Vref1−Vth) is stored in the first electrode of the sensing capacitor Css.

At a time point t4*a*, the second switch SW2 is turned off, and thus the sensing voltage (Vref1−Vth) of the first electrode of the sensing capacitor Css may be maintained. The sensing circuit 15 may convert the sensing voltage (Vref1−Vth), which is an analog value, into a digital value, and may determine the threshold voltage Vth of the first transistor T1 of the first pixel Pxij. For example, the sensing circuit 15 may sense the sensing voltage and the sensing controller 16 may set reference voltages used by the timing controller 11 to set the first reference Vref1. For example, the timing controller 11 may receive the reference voltages from the sensing controller 16 to generate the first reference voltage Vref1, receive the sensing voltage from the sensing circuit 15, and determine the threshold voltage Vth of the first transistor T1 by subtracting the received sensing voltage from the determined first reference voltage Vref1. The reference voltages may be set by the sensing controller 16 considering degradation information. The timing controller 11 may compensate an input grayscale using the determined threshold voltage and provide the compensated grayscale to the data driver 12.

At a time point t5*a*, the first scan signal having a turn-off level is supplied to the first scan line S1*i*, and the second scan signal having a turn-off level is supplied to the second scan line S2*i*. Further, the first switch SW1 is turned on. Therefore, the initialization voltage Vint may be applied to the third node N3.

Figure 7:
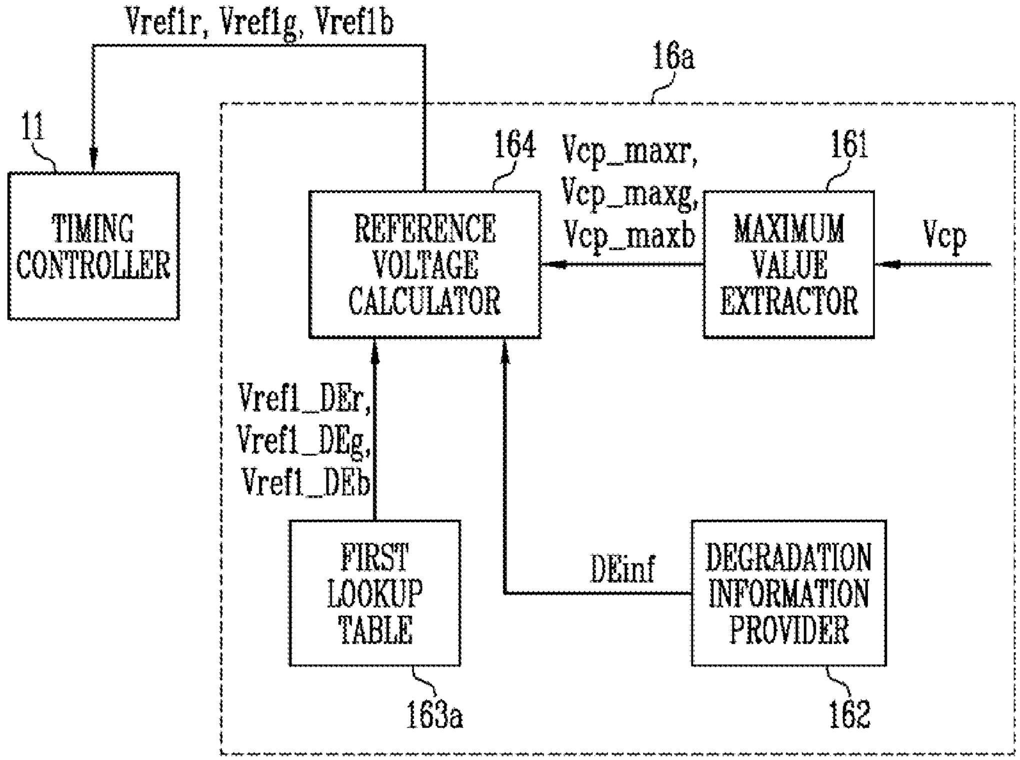
FIGS. 7 and 8 are diagrams illustrating a sensing controller according to an embodiment of the present disclosure.
Figure 8:
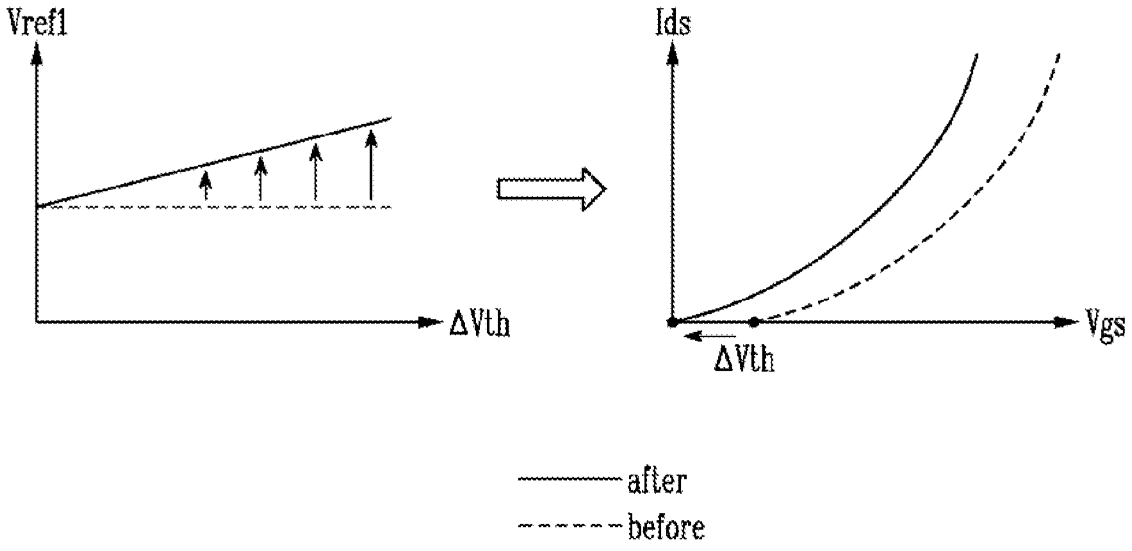

FIGS. 7 and 8 are diagrams illustrating a sensing controller according to an embodiment of the present disclosure. The sensing controller 16*a* of FIG. 7 may be used to implement the sensing controller 16 of FIG. 7.

the sensing controller 16*a* of FIG. 7 determines a first reference voltage Vref1*r*, a second reference voltage Vref1*g*, and a third reference voltage Vref1*b*. The first to third reference voltages Vref1*r*, Vref1*g*, and Vref1*b* may be voltages used to determine the threshold voltage Vth of the first transistor T1.

The sensing controller 16*a* includes a maximum value extractor 161 (e.g., a circuit), a degradation information provider 162 (e.g., a circuit), a first lookup table 163*a*, and a reference voltage calculator 164. For example, the sensing controller 16*a* may be operated whenever the display device 10 is powered on and is powered off.

The maximum value extractor 161 extracts a first maximum value Vcp_maxr from past compensation values Vcp for the first pixels. Also, the maximum value extractor 161 extracts a second maximum value Vcp_maxg from past compensation values Vcp for second pixels. Further, the maximum value extractor 161 extracts a third maximum value Vcp_maxb from past compensation values Vcp for third pixels.

The past compensation values Vcp may be values calculated based on past sensing voltages, and may correspond to values obtained by subtracting past input grayscale values from past compensation grayscale values. For example, during a certain past period (e.g., during the latest sensing period), the sensing circuit 15 is assumed to have received past sensing voltages for respective pixels. The timing controller 11 is assumed to have determined past compensation values Vcp for respective pixels based on the past sensing voltages. Also, during a certain past period (e.g., during the latest display period), the timing controller 11 is assumed to have supplied past compensation grayscale values, calculated by adding the past compensation values Vcp to the past input grayscale values, to the data driver 12. For example, when a past input grayscale value for a specific pixel is a 240-grayscale value and a past compensation value is a 4-grayscale value, a past compensation grayscale value for the specific pixel may be a 244-grayscale value.

The past compensation values Vcp for respective pixels may be independent of each other. For example, the past compensation values Vcp for the pixels may be different from each other. Therefore, the first maximum value Vcp_maxr, the second maximum value Vcp_maxg, and the third maximum value Vcp_maxb generated by the maximum value extractor 161 may be independent of each other. For example, the first maximum value Vcp_maxr, the second maximum value Vcp_maxg, and the third maximum value Vcp_maxb may be different from each other.

The degradation information provider 162 may provide degradation information Deinf pertaining to the first pixels, the second pixels, and the third pixels. For example, the degradation information Deinf may be determined based on at least one of the temperature, grayscale, and usage time of each of the first pixels, the second pixels, and the third pixels. For example, as the temperature becomes higher, the grayscale becomes larger, and the usage time is longer, the degree of degradation may be higher. The degradation information Deinf may be information indicating such a degree of degradation. The degradation information Deinf may be combined information for all pixels. In other embodiments, the degradation information Deinf may include first integrated degradation information for the first pixels, second integrated degradation information for the second pixels, and third integrated degradation information for the third pixels.

The first lookup table 163*a* provides a first base voltage value Vref1_Der for the first pixels (e.g., red pixels) corresponding to the degradation information Deinf, a second base voltage value Vref1_Deg for the second pixels (e.g., green pixels) corresponding to the degradation information Deinf, and a third base voltage value Vref1_Deb for the third pixels (e.g., blue pixels) corresponding to the degradation information Deinf. For example, the first lookup table 163*a* may be implemented as a memory. For example, as the degree of degradation becomes higher, the base voltage value becomes higher. In an embodiment, if a first pixel has been used for a first time and a second pixel has been used for a second longer time, the degradation information Deinf would cause a higher base voltage value to be selected for the second pixel than the first pixel. In an embodiment, if a temperature of a first pixel is higher than a temperature of a second pixel, the degradation information would cause a higher base voltage value to be selected for the first pixel than the second pixel.

In an embodiment, the reference voltage calculator 164 calculates the first reference voltage Vref1*r* by adding the first base voltage value Vref1_Der to the first maximum Vcp_maxr, calculates the second reference voltage Vref1*g* by adding the second base voltage value Vref1_Deg to the second maximum value Vcp_maxg, and calculates the third reference voltage Vref1*b* by adding the third base voltage value Vref1_Deb to the third maximum value Vcp_maxb. The sensing controller 16*a* may provide the first reference voltage Vref1*r*, the second reference voltage Vref1g, and the third reference voltage Vref1*b* to the timing controller 11.

The display device 10 according to the present embodiment may sense pixels in consideration of not only process variation but also the degree of degradation. Further, the display device 10 may improve the accuracy of sensing of the threshold voltage Vth of the first transistor T1 by utilizing the different reference voltages Vref1*r*, Vref1*g*, and Vref1*b* for respective colors. For example, because the light-emitting diodes LDr, LDg, and LDb of different colors include light-emitting layers formed of different materials, current versus luminance characteristics may differ from each other. Therefore, it is important to accurately sense the threshold voltage Vth of the first transistor T1 which determines the amount of driving current.

Referring to FIG. 8, the sensing controller 16*a* according to the present embodiment may provide a higher reference voltage Vref1 as the amount of degradation ΔVth of the threshold voltage of the first transistor T1 becomes larger (see the left graph). Therefore, suitable sensing may be performed, and the gate-source voltage (Vgs)-versus driving current (Ids) characteristics of the first transistor T1 may be appropriately compensated for during a display period (see the right graph).

Figure 9:
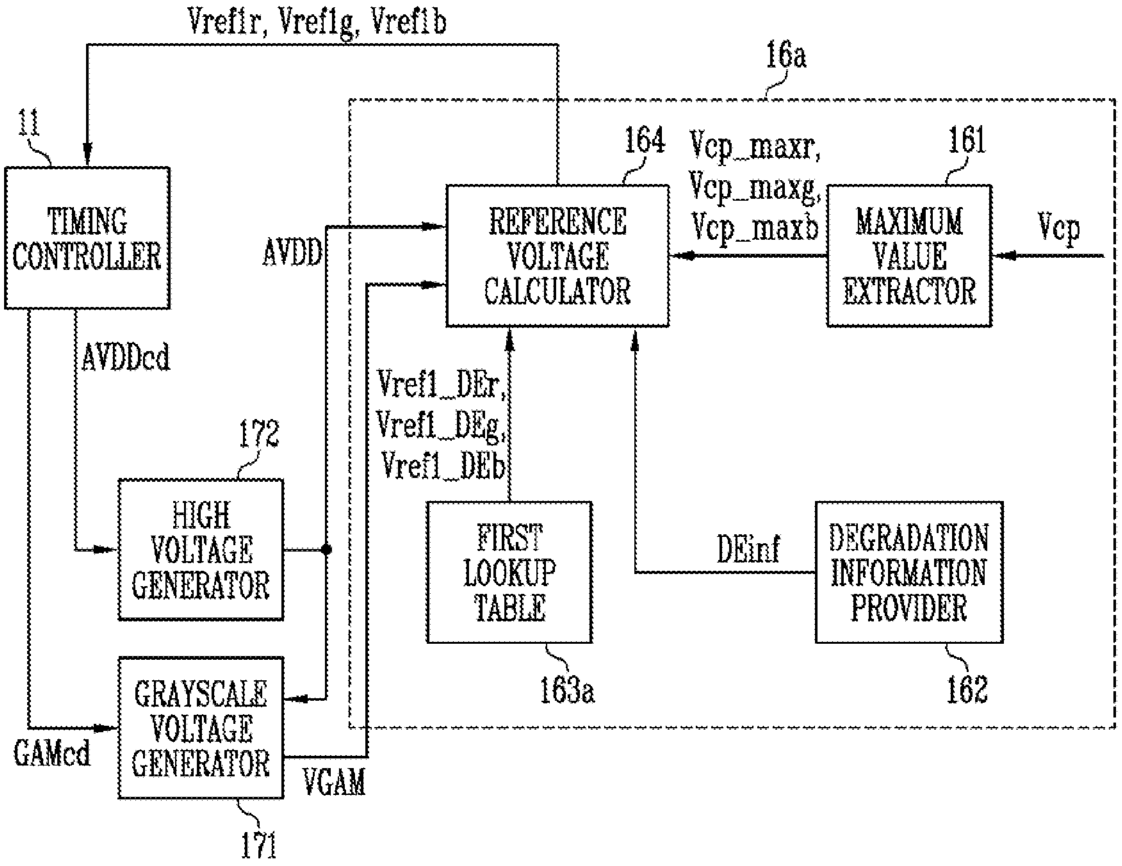
FIGS. 9 and 10 are diagrams illustrating a high voltage generator and a grayscale voltage generator according to an embodiment of the present disclosure.
Figure 10:
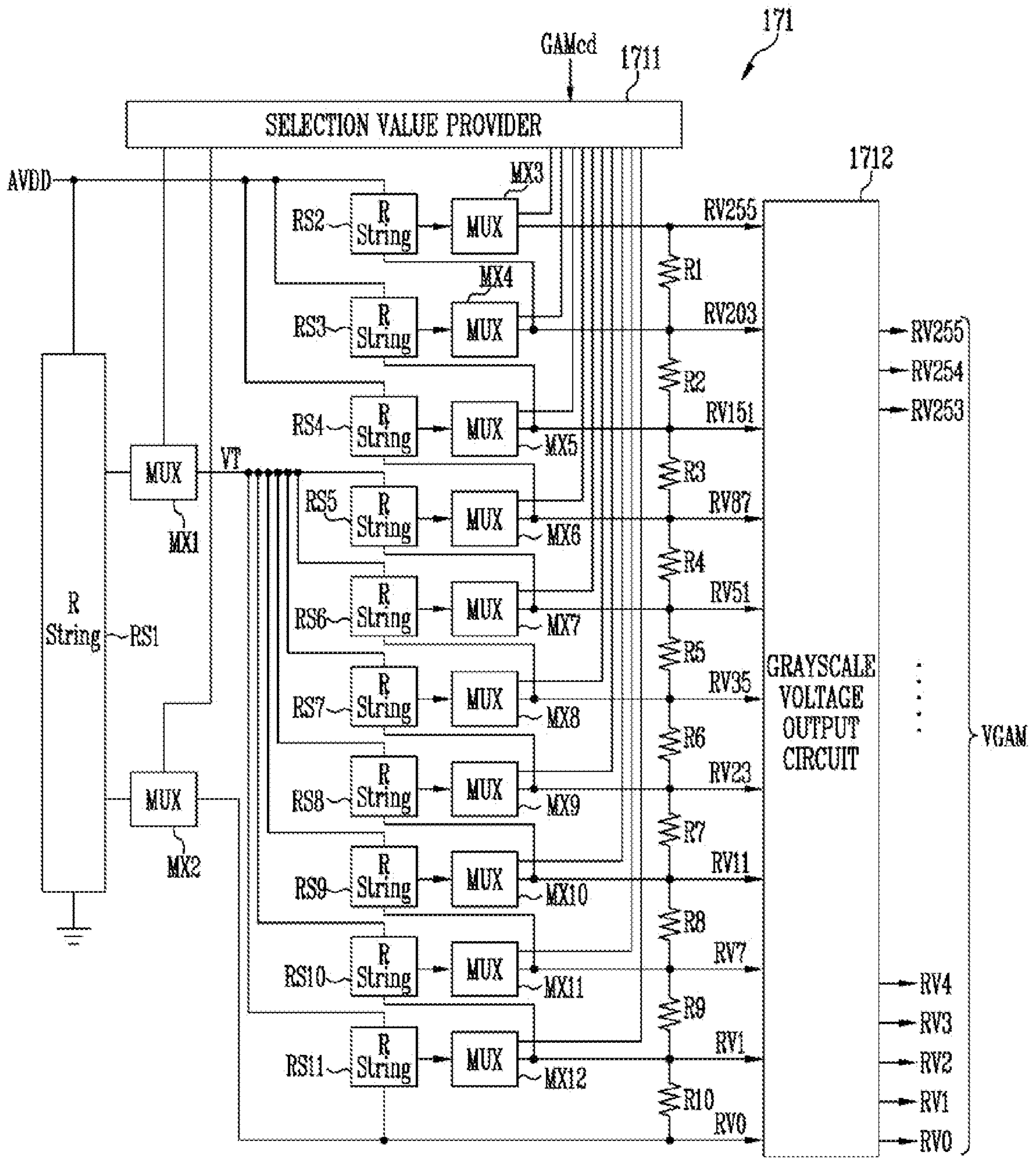

FIGS. 9 and 10 are diagrams illustrating a high voltage generator and a grayscale voltage generator according to an embodiment of the present disclosure.

The display device 10 of FIG. 9 may further include a high voltage generator 172 and a grayscale voltage generator 171 in comparison with the embodiment of FIG. 7.

The high voltage generator 172 may generate a high voltage AVDD. For example, the high voltage generator 172 may receive a high voltage code AVDDcd from the timing controller 11, and may generate the high voltage AVDD having a magnitude corresponding to the high voltage code AVDDcd. The high voltage AVDD may be higher than grayscale voltages VGAM which will be described later. For example, the high voltage generator 172 may be a DC-DC converter (e.g., a boost converter) for converting an input voltage into the high voltage AVDD.

The grayscale voltage generator 171 may generate grayscale voltages VGAM based on the high voltage AVDD. For example, the grayscale voltage generator 171 may receive a grayscale voltage code GAMcd from the timing controller 11, and may generate grayscale voltages VGAM having a magnitude corresponding to the grayscale voltage code GAMcd. For example, the grayscale voltage generator 171 may generate the grayscale voltages VGAM by dividing the high voltage AVDD.

The reference voltage calculator 164 may generate a first reference voltage Vref1*r*, a second reference voltage Vref1*g*, and a third reference voltage Vref1*b* based on the high voltage AVDD and the grayscale voltages VGAM. For example, the reference voltage calculator 164 may generate the first reference voltage Vref1*r* by selecting the high voltage AVDD and any one of the grayscale voltages VGAM. Similarly, the reference voltage calculator 164 may generate the second reference voltage Vref1*g* by selecting the high voltage AVDD and any one of the grayscale voltages VGAM. Further, the reference voltage calculator 164 may generate the third reference voltage Vref1*b* by selecting the high voltage AVDD and any one of the grayscale voltages VGAM. In other embodiments, the reference voltage calculator 164 may generate a new voltage by dividing the voltage based on the high voltage AVDD and the grayscale voltages VGAM, and may set the new voltage as the first reference voltage Vref1*r*, the second reference voltage Vref1*g*, or the third reference voltage Vref1*b*.

In accordance with the present embodiment, the grayscale voltage generator 171 that is used for generation of data voltages may be utilized during a display period, thus a separate converter for generating the first to third reference voltages Vref1*r*, Vref1*g*, and Vref1*b* is not necessary.

Referring to FIG. 10, an embodiment of the grayscale voltage generator 171 is illustrated.

The grayscale voltage generator 171 includes a selection value provider 1711 (e.g., a circuit), a grayscale voltage output circuit 1712, resistor strings RS1 to RS11, multiplexers MX1 to MX12, and resistors R1 to R10.

The selection value provider 1711 may provide selection values for the multiplexers the MX1 to MX12 based on the grayscale voltage code GAMcd. The selection values based on the grayscale voltage code GAMcd may be stored in advance in a memory device, e.g., an element such as a register.

The resistor string RS1 may generate intermediate voltages between a high voltage AVDD and a low voltage (e.g., a ground voltage). The multiplexer MX1 may select one of intermediate voltages provided from the resistor string RS1 depending on a corresponding selection value, and may then output the selected intermediate voltage as a reference voltage VT. The multiplexer MX2 may select one of the intermediate voltages provided from the resistor string RS1 depending on a corresponding selection value, and may then output a 0-grayscale voltage RV0.

The resistor string RS11 may generate intermediate voltages between the reference voltage VT and the 0-grayscale voltage RV0. The multiplexer MX12 may select one of the intermediate voltages provided from the resistor string RS11 depending on a corresponding selection value, and may then output a 1-grayscale voltage RV1.

The resistor string RS10 may generate intermediate voltages between the reference voltage VT and the 1-grayscale voltage RV1. The multiplexer MX11 may select one of the intermediate voltages provided from the resistor string RS10 depending on a corresponding selection value, and may then output a 7-grayscale voltage RV7.

The resistor string RS9 may generate intermediate voltages between the reference voltage VT and the 7-grayscale voltage RV7. The multiplexer MX10 may select one of the intermediate voltages provided from the resistor string RS9 depending on a corresponding selection value, and may then output an 11-grayscale voltage RV11.

The resistor string RS8 may generate intermediate voltages between the reference voltage VT and the 11-grayscale voltage RV11. The multiplexer MX9 may select one of the intermediate voltages provided from the resistor string RS8 depending on a corresponding selection value, and may then output a 23-grayscale voltage RV23.

The resistor string RS7 may generate intermediate voltages between the reference voltage VT and the 23-grayscale voltage RV23. The multiplexer MX8 may select one of the intermediate voltages provided from the resistor string RS7 depending on a corresponding selection value, and may then output a 35-grayscale voltage RV35.

The resistor string RS6 may generate intermediate voltages between the reference voltage VT and the 35-grayscale voltage RV35. The multiplexer MX7 may select one of the intermediate voltages provided from the resistor string RS6 depending on a corresponding selection value, and may then output a 51-grayscale voltage RV51.

The resistor string RS5 may generate intermediate voltages between the reference voltage VT and the 51-grayscale voltage RV51. The multiplexer MX6 may select one of the intermediate voltages provided from the resistor string RS5 depending on a corresponding selection value, and may then output an 87-grayscale voltage RV87.

The resistor string RS4 may generate intermediate voltages between the high voltage AVDD and 87-grayscale voltage RV87. The multiplexer MX5 may select one of the intermediate voltages provided from the resistor string RS4 depending on a corresponding selection value, and may then output a 151-grayscale voltage RV151.

The resistor string RS3 may generate intermediate voltages between the high voltage AVDD and 151-grayscale voltage RV151. The multiplexer MX4 may select one of the intermediate voltages provided from the resistor string RS3 depending on a corresponding selection value, and may then output a 203-grayscale voltage RV203.

The resistor string RS2 may generate intermediate voltages between the high voltage AVDD and 203-grayscale voltage RV203. The multiplexer MX3 may select one of the intermediate voltages provided from the resistor string RS2 depending on a corresponding selection value, and may then output a 255-grayscale voltage RV255.

The above-described 0-, 1-, 7-, 11-, 23-, 35-, 51-, 87-, 151-, 203-, and 255-grayscale values may be referred to as "reference grayscale values". Further, the grayscale voltages RV0, RV1, RV7, RV11, RV23, RV35, RV51, RV87, RV151, RV203, and RV255 generated by the multiplexers MX2 to MX12 may be referred to as "reference grayscale voltages". The number of reference grayscale values and grayscale numbers corresponding to respective reference grayscale values may be set differently according to the product. Hereinafter, for convenience of description, 0-, 1-, 7-, 11-, 23-, 35-, 51-, 87-, 151-, 203-, and 255-grayscale values will be described as being reference grayscale values.

The grayscale voltage output circuit 1712 may generate grayscale voltages RV0, RV1, RV2, RV3, RV4, RV253, RV254, and RV255 by dividing the reference grayscale voltages RV0, RV1, RV7, RV11, RV23, RV35, RV51, RV87, RV151, RV203, and RV255. For example, the grayscale voltage output circuit 1712 may generate grayscale voltages RV2 to RV6 by dividing the reference grayscale voltages RV1 and RV7.

The grayscale voltages VGAM received from the reference voltage calculator 164 may be identical to the grayscale voltages RV0, RV1, RV2, RV3, RV4, RV253, RV254, and RV255. In other embodiments, the grayscale voltages VGAM received from the reference voltage calculator 164 may be identical to the reference grayscale voltages RV0, RV1, RV7, RV11, RV23, RV35, RV51, RV87, RV151, RV203, and RV255.

Figure 11:
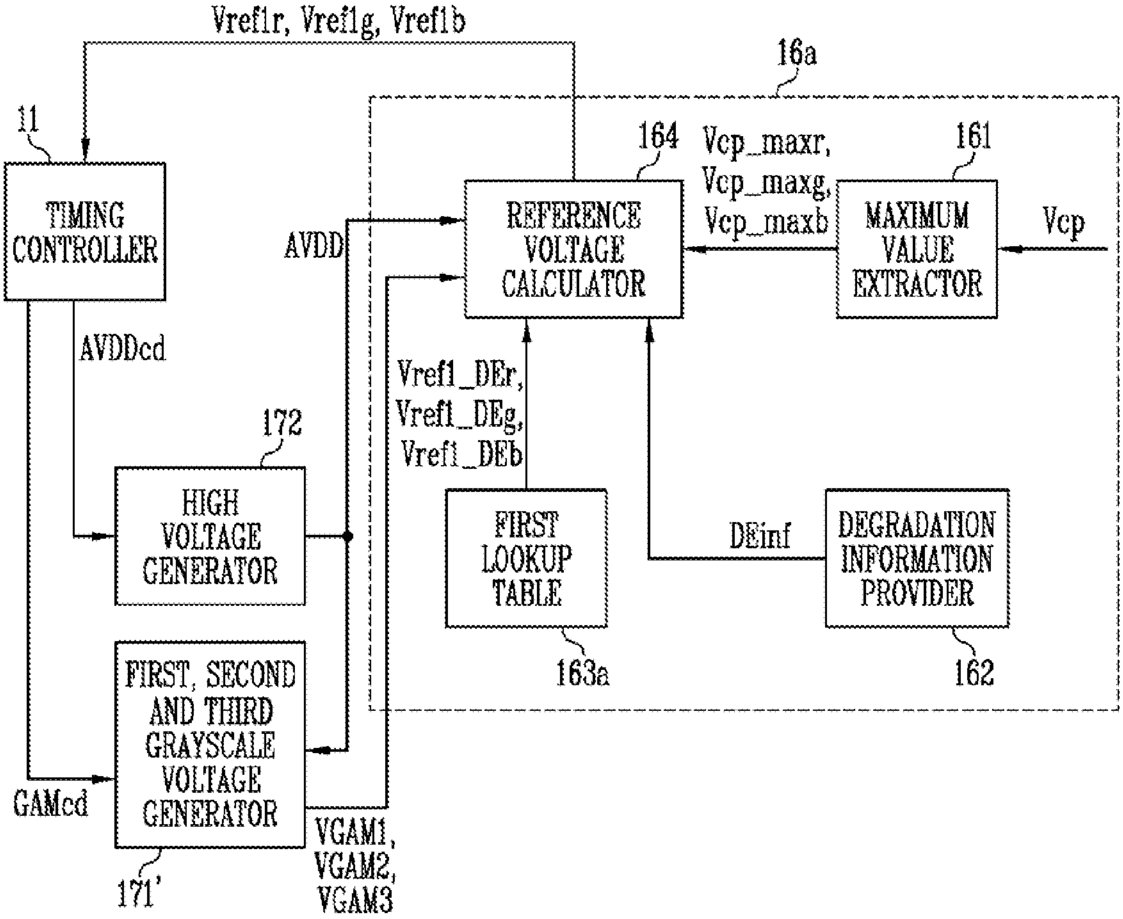
FIG. 11 is a diagram illustrating grayscale voltage generators according to an embodiment of the present disclosure.

FIG. 11 is a diagram illustrating grayscale voltage generators according to an embodiment of the present disclosure.

The display device 10 of FIG. 11 is different from the display device 10 of FIG. 9 in that the display device 10 of FIG. 11 includes first, second and third grayscale voltage generators '71'.

The first grayscale voltage generator may generate first grayscale voltages VGAM1 for first pixels based on a high voltage AVDD. The second grayscale voltage generator may generate second grayscale voltages VGAM2 for second pixels based on the high voltage AVDD. The third grayscale voltage generator may generate third grayscale voltages VGAM3 for third pixels based on the high voltage AVDD.

Since each of the first, second, and third grayscale voltage generators 171' has substantially the same structure as that of FIG. 10, repeated descriptions thereof will be omitted. However, selection values stored in the selection value providers of the first to third grayscale voltage generators 171' corresponding to different colors may differ from those of the foregoing embodiment.

The reference voltage calculator 164 may generate a first reference voltage Vref1*r* based on the high voltage AVDD and the first grayscale voltages VGAM1, may generate a second reference voltage Vref1*g* based on the high voltage AVDD and the second grayscale voltages VGAM2, and may generate a third reference voltage Vref1*b* based on the high voltage AVDD and the third grayscale voltages VGAM3.

In accordance with the present embodiment, during a display period, the first to third grayscale voltage generators 171' used to generate data voltages corresponding to first to third colors may be utilized. Thus, a separate converter for generating the first to third reference voltages Vref1*r*, Vref1*g*, and Vref1*b* is not necessary.

Figure 12:
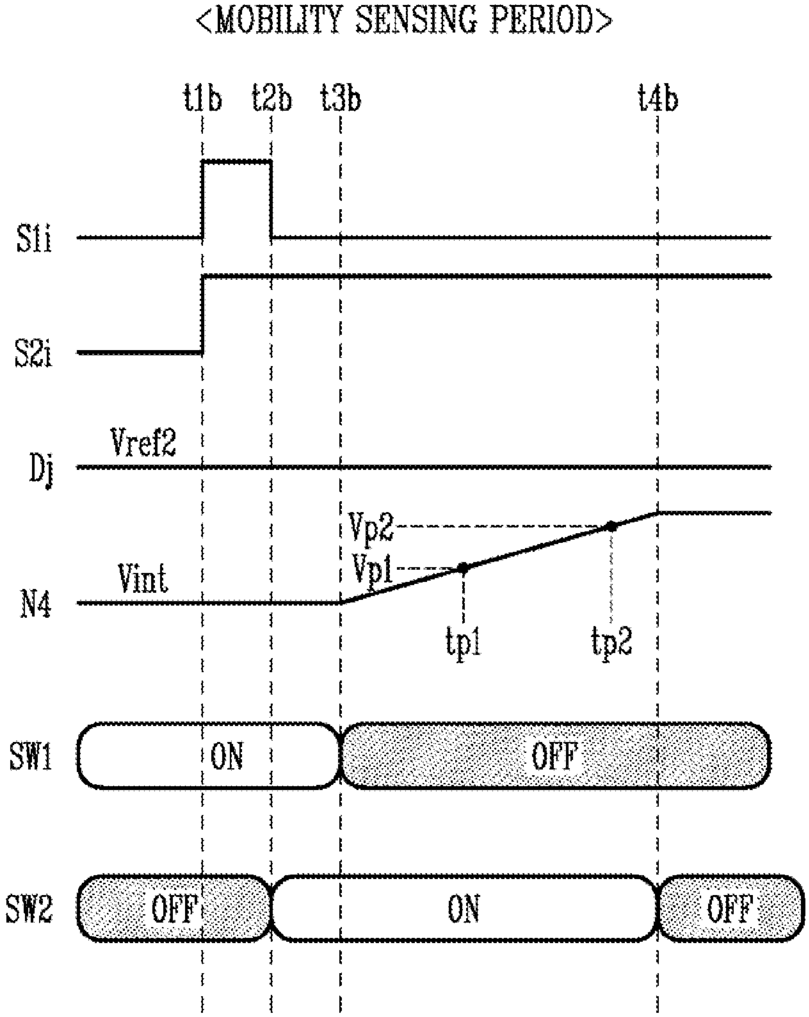
FIG. 12 is a diagram illustrating a mobility sensing period according to an embodiment of the present disclosure.

FIG. 12 is a diagram illustrating a mobility sensing period according to an embodiment of the present disclosure.

At a time point t1*b*, a first scan signal having a turn-on level is applied to a first scan line S1*i*, and a second scan signal having a turn-on level is applied to a second scan line S2*i*. In an embodiment, the first scan line S1*i* is connected to pixels of a first pixel row and the second scan line S2*i* is connected to a pixels of a second pixel row that is immediately adjacent to the first pixel row. Here, because a reference voltage Vref2 is already applied to the data line Dj, the reference voltage Vref2 is applied to the first node N1. Also, because the first switch SW1 is in a turn-on state, the initialization voltage Vint is applied to the second node N2 and the third node N3. Therefore, the first transistor T1 may be turned on depending on the difference between the gate voltage and the source voltage of the first transistor T1.

At a time point t2*b*, since a first scan signal having a turn-off level is applied to the first scan line S1*i*, the first node N1 may float. Further, because the second switch SW2 is turned on, the initialization voltage Vint is applied to the fourth node N4.

At a time point t3*b*, the first switch SW1 is turned off. Accordingly, since current is supplied from the first power line ELVDD through the first transistor T1, the voltages of the second, third, and fourth nodes N2, N3, and N4 increase. In this embodiment, because the first node N1 is floating, the gate-source voltage difference of the first transistor T1 may be maintained.

At a time point t4*b*, the second switch SW2 is turned off. Accordingly, a sensing voltage is stored in the first electrode of the sensing capacitor Css. The mobility of the first transistor T1 may be calculated using the following Equation (1):

$$u=C^*(V-2-Vp1)/(tp2-tp1) \quad (1)$$

Here, u is the mobility of the first transistor T1, C is a preset constant, Vp2 is a sensing voltage at a time point tp1, and Vp1 is a sensing voltage at a time point tp2.

Assuming that a voltage slope of the fourth node N4 between the time point t3*b* and the time point t4*b* is linear, the sensing voltage Vint at the time point t3*b* and the sensing voltage at the time point t4*b* can be determined, and thus the mobility of the first transistor T1 may be obtained.

Figure 13:
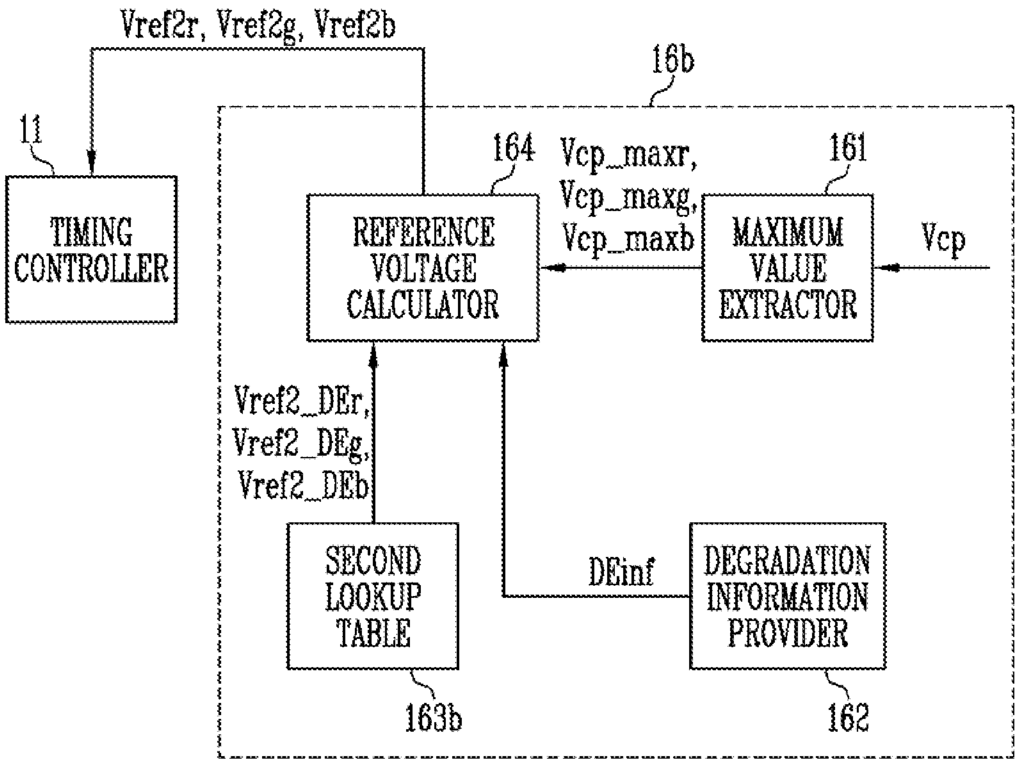
FIGS. 13 and 14 are diagrams illustrating a sensing controller according to an embodiment of the present disclosure.
Figure 14:
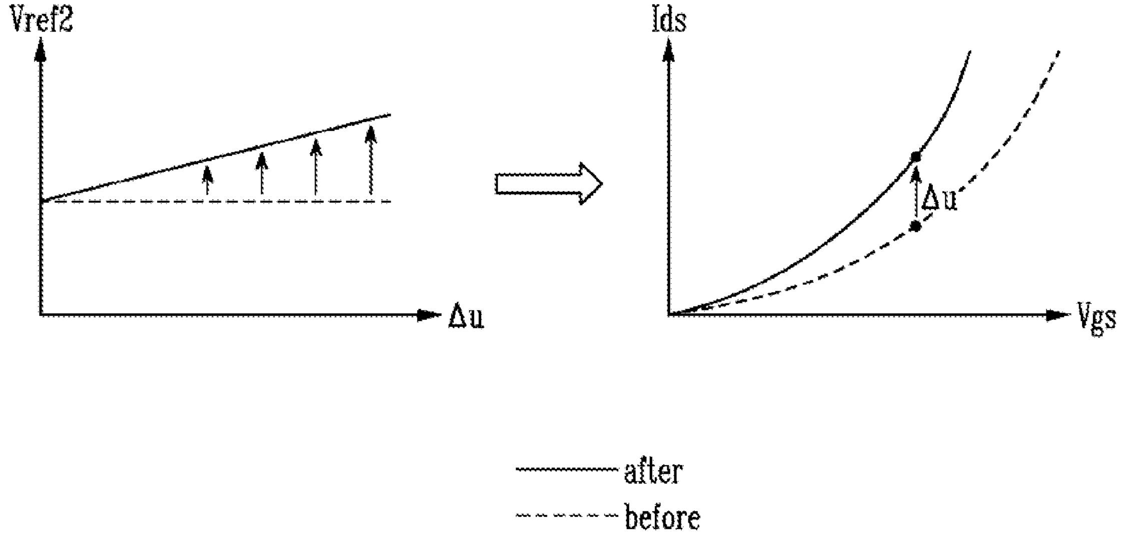

FIGS. 13 and 14 are diagrams illustrating a sensing controller according to an embodiment of the present disclosure. The sensing controller 16*b* may be used to implement the sensing controller 16 of FIG. 1.

Referring to FIG. 13, the sensing controller 16*b* determines a first reference voltage Vref2*r*, a second reference voltage Vref2*g*, and a third reference voltage Vref2*b*. The first to third reference voltages Vref2*r*, Vref2*g*, and Vref2*b* may be voltages used to determine the mobility of the first transistor T1.

The sensing controller 16*b* includes a maximum value extractor 161, a degradation information provider 162, a second lookup table 163*b*, and a reference voltage calculator 164. Because the components of the sensing controller 16*b*, except for the second lookup table 163*b*, are the same as those of the sensing controller 16*a* of FIG. 7, repeated descriptions thereof will be omitted.

The second lookup table 163*b* provides a first base voltage value Vref2_DEr for first pixels corresponding to degradation information DEinf, a second base voltage value Vref2_DEg for second pixels corresponding to the degradation information DEinf, and a third base voltage value Vref2_DEb for third pixels corresponding to the degradation information DEinf. For example, the second lookup table 163*b* may be implemented as a memory. For example, as the degree of degradation becomes higher, the base voltage value may become higher.

The first to third base voltage values Vref2_DEr, Vref2_DEg, and Vref2_DEb of the second lookup table 163*b* may be base voltage values for mobility sensing, and may be different from the first to third base voltage values Vref1_DEr, Vref1_DEg, and Vref1_DEb of the first lookup table 163*a* for threshold voltage sensing.

The display device 10 according to the present embodiment may sense pixels in consideration of not only process variation but also the degree of degradation. Further, the display device 10 may improve the accuracy of sensing of the mobility of the first transistor T1 by utilizing different reference voltages Vref2*r*, Vref2*g*, and Vref2*b* for respective colors. For example, because the light-emitting diodes LDr, LDg, and LDb of different colors include light-emitting layers formed of different materials, current versus luminance characteristics may differ from each other. Therefore, it is important to accurately sense the mobility of the first transistor T1 which determines the amount of driving current.

Although not illustrated in the drawing, even in the embodiment where the display device 10 includes the sensing controller 16*b*, embodiments of the high voltage generator and the grayscale voltage generator of FIGS. 9 to 12 may be applied together to the display device 10.

Referring to FIG. 14, the sensing controller 16*b* according to the present embodiment may provide a higher reference voltage Vref2 as the amount of degradation (Au) of the mobility of the first transistor T1 becomes larger (see the left graph). Therefore, suitable sensing may be performed, and the gate-source voltage (Vgs)-versus driving current (Ids) characteristics of the first transistor T1 may be appropriately compensated for during a display period (see the right graph).

Figure 15:
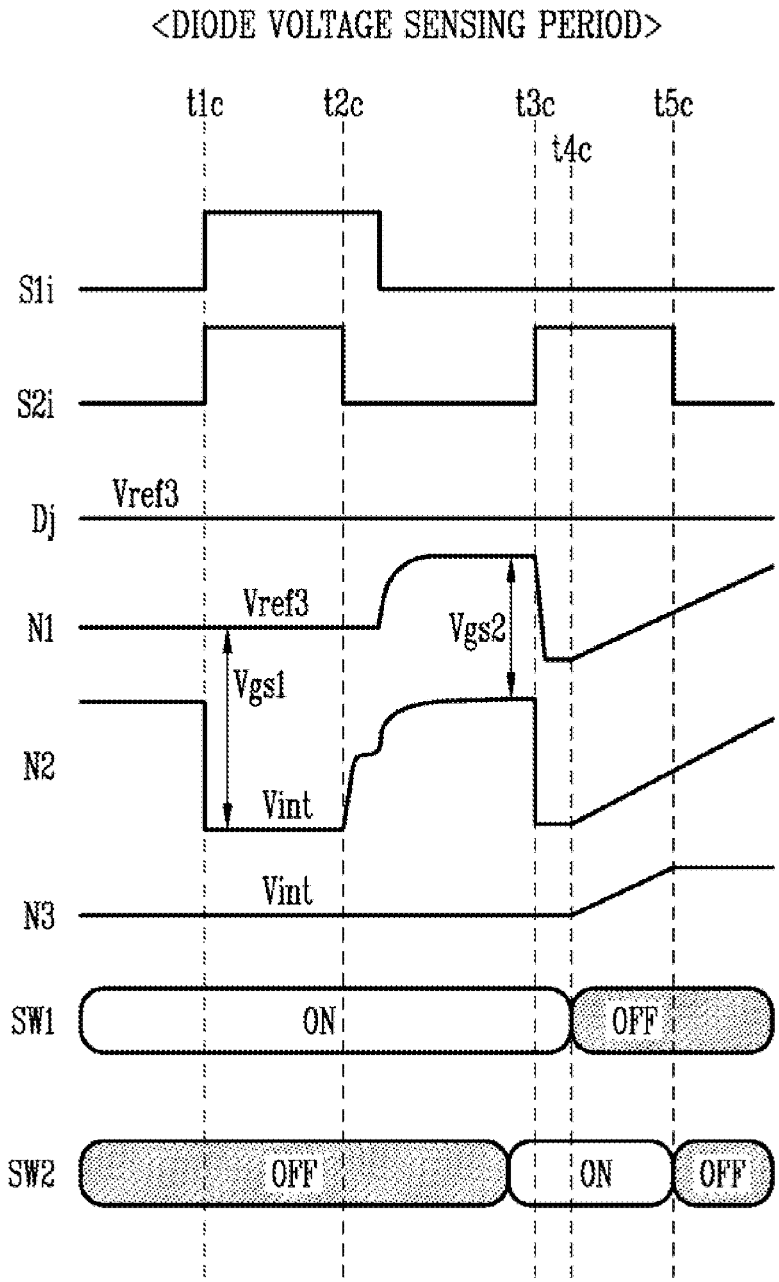
FIG. 15 is a diagram illustrating a threshold voltage sensing period of a light-emitting diode according to an embodiment of the present disclosure.

FIG. 15 is a diagram illustrating a threshold voltage sensing period of a light-emitting diode according to an embodiment of the present disclosure.

At a time point t1*c*, a first scan signal having a turn-on level is applied to a first scan line S1*i*, and a second scan signal having a turn-on level is applied to a second scan line S2*i*. Here, because a reference voltage Vref3 is already applied to the data line Dj, the reference voltage Vref3 is applied to the first node N1. Also, because the first switch SW1 is in a turn-on state, the initialization voltage Vint is applied to the second node N2 and the third node N3. Therefore, the first transistor T1 may be turned on depending on the gate-source voltage Vgs1.

At a time point t2*c*, a second scan signal having a turn-off level is applied to the second scan line S2*i*. Further, at the time point t2*c* or immediately after the time point t2*c*, the first scan signal having a turn-off level is applied to the first scan line S1*i*. Here, the voltage of the second node N2 may be increased by current supplied from the first power line ELVDD. Further, the voltage of the first node N1 that is coupled to the second node N2 and is floating also increases. Here, the voltage of the second node N2 may be saturated to a voltage corresponding to the threshold voltage of the light-emitting diode LDg. As the degree of degradation of the light-emitting diode LDg becomes higher, the saturated voltage of the second node N2 may become higher. Due to the saturated voltage of the second node N2, the gate-source voltage Vgs2 of the first transistor T1 may be reset. For example, the reset gate-source voltage Vgs2 may be lower than the preset gate-source voltage Vgs1.

At a time point t3*c*, the second scan signal having a turn-on level is applied to the second scan line S2*i*. Therefore, the initialization voltage Vint is applied to the second node N2. Here, the reset gate-source voltage Vgs2 may be maintained by the storage capacitor Cst.

At a time point t4*c*, the first switch SW1 is turned off. Here, because the second switch SW2 is in a turn-on state, the voltages of the second node N2, the third node N3, and the fourth node N4 may increase. As the degree of degradation of the light-emitting diode LDg (or the threshold voltage of the light-emitting diode LDg) becomes higher, the rising slope of the voltage may become gentler.

At a time point t5*c*, the second scan signal having a turn-off level is applied to the second scan line S2*i*, and the second switch SW2 is turned off. Accordingly, the threshold voltage of the light-emitting diode LDg may be calculated using the sensing voltage stored in the sensing capacitor Css.

Figure 16:
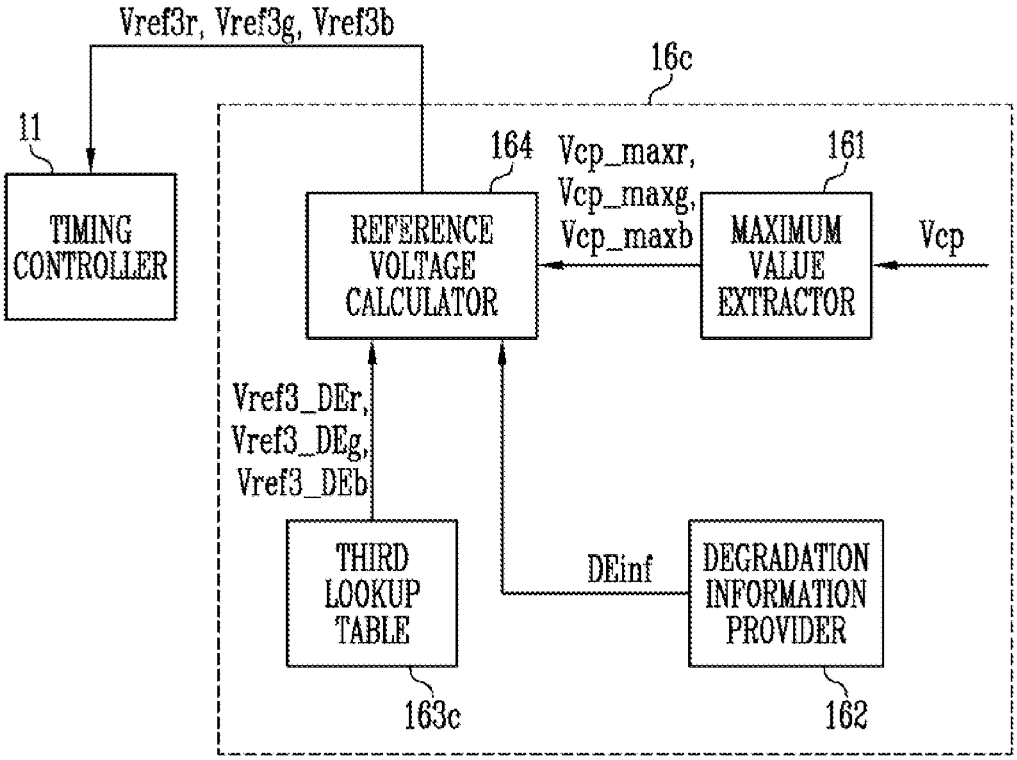
FIGS. 16 and 17 are diagrams illustrating a sensing controller according to an embodiment of the present disclosure.
Figure 17:
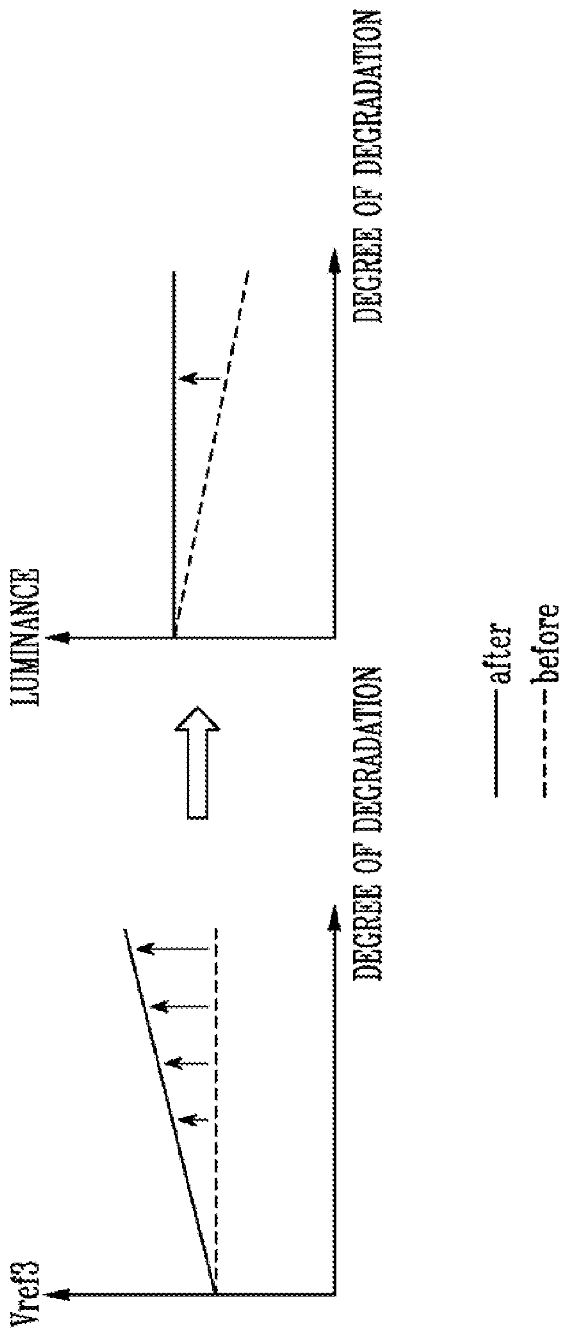

FIGS. 16 and 17 are diagrams illustrating a sensing controller according to an embodiment of the present disclosure. The sensing controller 16*c* may be used to implement the sensing controller 16 of FIG. 1.

Referring to FIG. 16, a sensing controller 16*c* determines a first reference voltage Vref3*r*, a second reference voltage Vref3*g*, and a third reference voltage Vref3*b*. The first to third reference voltages Vref3*r*, Vref3*g*, and Vref3*b* are voltages used to determine the threshold voltages of the light-emitting diodes.

The sensing controller 16*c* includes a maximum value extractor 161, a degradation information provider 162, a third lookup table 163*c*, and a reference voltage calculator 164. Because the components of the sensing controller 16*c*, except for the third lookup table 163*c*, are the same as those of the sensing controller 16*a* of FIG. 7, repeated descriptions thereof will be omitted.

The third lookup table 163*c* provides a first base voltage value Vref3_DEr for first pixels corresponding to degradation information DEinf, a second base voltage value Vref3_DEg for second pixels corresponding to the degradation information DEinf, and a third base voltage value Vref3_DEb for third pixels corresponding to the degradation information DEinf. For example, the third lookup table 163*c* may be implemented as a memory. For example, as the degree of degradation becomes higher, the base voltage value may become higher.

The first to third base voltage values Vref3_DEr, Vref3_DEg, and Vref3_DEb of the third lookup table 163*c* are base voltages used to sense the threshold voltages of the light-emitting diodes, and may be different from the base voltage values of the first lookup table 163*a* for sensing threshold voltages and the second lookup table 163*b* for sensing mobility.

The display device 10 according to the present embodiment may sense pixels in consideration of not only process variation but also the degree of degradation. Further, the display device 10 may improve the accuracy of sensing of threshold voltages of light-emitting diodes by utilizing different reference voltages Vref3*r*, Vref3*g*, and Vref3*b* for respective colors. For example, because the light-emitting diodes LDr, LDg, and LDb of different colors include light-emitting layers formed of different materials, threshold voltage characteristics may differ from each other.

Although not illustrated in the drawing, even in the embodiment where the display device 10 includes the sensing controller 16*c*, embodiments of the high voltage generator and the grayscale voltage generator of FIGS. 9 to 12 may be applied together to the display device 10.

Referring to FIG. 17, the sensing controller 16*c* according to the present embodiment may provide a higher reference voltage Vref3 as the degree of degradation (e.g., threshold voltage) of each light-emitting diode becomes higher (see the left graph). Accordingly, suitable sensing may be performed, and the degree of degradation of light-emitting diodes may be suitably compensated for during the display period. Thus, a luminance for a specific grayscale may be maintained regardless of the degree of degradation (see the right graph).

The drawings that have been referred to and the detailed description of the present disclosure are merely exemplary for the present disclosure, and are only intended to describe the present disclosure, rather than limit meanings or restrict the scope of the present disclosure described in the claims. Therefore, it will be appreciated to those of ordinary skill in the art that various modifications and other embodiments may be implemented from those embodiments.

A display device according to at least one embodiment of the present disclosure may sense pixels in consideration of not only process variation but also the degree of degradation.

What is claimed is:

1. A display device, comprising:

first pixels configured to emit light in a first color;

second pixels configured to emit light in a second color different from the first color;

a data driver configured to supply first reference voltages to data lines coupled to the first pixels; and a sensing circuit configured to receive first sensing voltages from sensing lines coupled to the first pixels, during a first period, wherein, during the first period, the data driver configured to supply data voltages having a turn-off level to data lines coupled to the second pixels, wherein the data driver supplies second reference voltages different from the first reference voltages to the data lines coupled to the second pixels, wherein the sensing circuit receives second sensing voltages from sensing lines coupled to the second pixels, during a second period different from the first period, and wherein, during the second period, the data driver configured to supply data voltages having a turn-off level to the data lines coupled to the first pixels.

2. The display device according to claim 1, wherein:

the first reference voltages have an identical magnitude, and the second reference voltages have an identical magnitude.

3. The display device according to claim 2, further comprising:

a sensing controller configured to determine the first reference voltages and the second reference voltages, wherein the sensing controller comprises:

a maximum value extractor configured to extract a first maximum value from past compensation values for the first pixels and extract a second maximum value from past compensation values for the second pixels.

4. The display device according to claim 3, wherein the sensing controller further comprises:

a degradation information provider configured to provide degradation information for the first pixels and the second pixels.

5. The display device according to claim 4, wherein the degradation information is determined based on at least one of temperature, grayscale, and usage time of the first pixels and the second pixels.

6. The display device according to claim 4, wherein the sensing controller further comprises:

a lookup table configured to provide a first base voltage value for the first pixels corresponding to the degradation information and a second base voltage value for the second pixels corresponding to the degradation information.

7. The display device according to claim 6, wherein the sensing controller further comprises:

a reference voltage calculator configured to calculate a first reference voltage by adding the first base voltage value to the first maximum value and calculate a second reference voltage by adding the second base voltage value to the second maximum value.

8. The display device according to claim 7, further comprising:

a high voltage generator configured to generate a high voltage; and a grayscale voltage generator configured to generate grayscale voltages based on the high voltage, wherein the reference voltage calculator generates the first reference voltage and the second reference voltage based on the high voltage and the grayscale voltages.

9. The display device according to claim 7, further comprising:

a high voltage generator configured to generate a high voltage;

a first grayscale voltage generator configured to generate first grayscale voltages for the first pixels based on the high voltage; and a second grayscale voltage generator configured to generate second grayscale voltages for the second pixels based on the high voltage, wherein the reference voltage calculator generates the first reference voltage based on the high voltage and the first grayscale voltages, and generates the second reference voltage based on the high voltage and the second grayscale voltages.

10. The display device according to claim 1, wherein one of the first pixels and one of the second pixels are coupled to an identical sensing line.

11. The display device according to claim 1, further comprising:

third pixels configured to emit light in a third color different from the first color and the second color, wherein the data driver supplies third reference voltages, different from the first reference voltages and the second reference voltages, to data lines coupled to the third pixels, and wherein the sensing circuit receives third sensing voltages from sensing lines coupled to the third pixels.

12. The display device according to claim 11, wherein:

the first reference voltages have an identical magnitude, the second reference voltages have an identical magnitude, and the third reference voltages have an identical magnitude.

13. The display device according to claim 12, further comprising:

a sensing controller configured to determine the first reference voltages, the second reference voltages, and the third reference voltages, wherein the sensing controller comprises:

a maximum value extractor configured to extract a first maximum value from past compensation values for the first pixels, extract a second maximum value from past compensation values for the second pixels, and extract a third maximum value from past compensation values for the third pixels.

14. The display device according to claim 13, wherein the sensing controller further comprises:

a degradation information provider configured to provide degradation information for the first pixels, the second pixels, and the third pixels.

15. The display device according to claim 14, wherein the degradation information is determined based on at least one of temperature, grayscale, and usage time of the first pixels, the second pixels, and the third pixels.

16. The display device according to claim 14, wherein the sensing controller further comprises:

a lookup table configured to provide a first base voltage value for the first pixels corresponding to the degradation information, a second base voltage value for the second pixels corresponding to the degradation information, and a third base voltage value for the third pixels corresponding to the degradation information.

17. The display device according to claim 16, wherein the sensing controller further comprises:

a reference voltage calculator configured to calculate a first reference voltage by adding the first base voltage value to the first maximum value, calculate a second reference voltage by adding the second base voltage value to the second maximum value, and calculate a third reference voltage by adding the third base voltage value to the third maximum value.

18. The display device according to claim 17, further comprising:

a high voltage generator configured to generate a high voltage; and a grayscale voltage generator configured to generate grayscale voltages based on the high voltage, wherein the reference voltage calculator generates the first reference voltage, the second reference voltage, and the third reference voltage based on the high voltage and the grayscale voltages.

19. The display device according to claim 17, further comprising:

a high voltage generator configured to generate a high voltage;

a first grayscale voltage generator configured to generate first grayscale voltages for the first pixels based on the high voltage;

a second grayscale voltage generator configured to generate second grayscale voltages for the second pixels based on the high voltage; and a third grayscale voltage generator configured to generate third grayscale voltages for the third pixels based on the high voltage, wherein the reference voltage calculator generates the first reference voltage based on the high voltage and the first grayscale voltages, generates the second reference voltage based on the high voltage and the second grayscale voltages, and generates the third reference voltage based on the high voltage and the third grayscale voltages.

20. The display device according to claim 11, wherein one of the first pixels, one of the second pixels, and one of the third pixels are coupled to an identical sensing line.

* * * * *